(12) United States Patent
Chen et al.

(10) Patent No.: US 12,463,848 B1
(45) Date of Patent: Nov. 4, 2025

(54) SYSTEMS AND METHODS FOR DATA CHANNEL ESTIMATION IN FIFTH GENERATION NEW RADIO PHYSICAL UPLINK SHARED CHANNELS

(71) Applicant: Meta Platforms Technologies, LLC, Menlo Park, CA (US)

(72) Inventors: Weizhong Chen, Georgetown, TX (US); Krishna Srikanth Gomadam, San Jose, CA (US); Djordje Tujkovic, Los Altos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 405 days.

(21) Appl. No.: 18/194,334

(22) Filed: Mar. 31, 2023

Related U.S. Application Data

(60) Provisional application No. 63/326,232, filed on Mar. 31, 2022.

(51) Int. Cl.
*H04L 25/02* (2006.01)

(52) U.S. Cl.
CPC ...... *H04L 25/0224* (2013.01); *H04L 25/0204* (2013.01); *H04L 25/022* (2013.01)

(58) Field of Classification Search
CPC ............. H04L 25/0204; H04L 25/0224; H04L 25/022
See application file for complete search history.

(56) References Cited

U.S. PATENT DOCUMENTS

| | | | | |
|---|---|---|---|---|
| 8,699,595 | B2 * | 4/2014 | Martinez | H04L 25/022 375/267 |
| 11,632,272 | B1 * | 4/2023 | Patchava | H04L 27/26532 375/316 |
| 12,113,655 | B2 * | 10/2024 | Marupaduga | H04L 5/10 |
| 2012/0087428 | A1 * | 4/2012 | Martinez | H04L 25/022 375/295 |
| 2014/0086111 | A1 * | 3/2014 | Li | H04W 72/0446 370/336 |
| 2014/0254421 | A1 * | 9/2014 | Ahlander | H04L 25/0202 370/252 |
| 2019/0281621 | A1 * | 9/2019 | Noh | H04L 5/0094 |

(Continued)

*Primary Examiner* — Jenee Holland
(74) *Attorney, Agent, or Firm* — EVERSHEDS SUTHERLAND (US) LLP

(57) ABSTRACT

A disclosed computer-implemented method may include receiving, as part of a demodulation reference signal (DMRS) channel estimation operation, a frequency-domain channel estimation signal that includes a sequence of DMRS channels. The method may also include generating an augmented DMRS channel sequence that may include generating (1) based on an edge DMRS channel and an additional DMRS channel included in the sequence of DMRS channels, an extended DMRS channel sequence that includes a plurality of extended DMRS channels that extend a frequency range of the sequence of DMRS channels, and (2) based on an interpolation matrix and the extended DMRS channel sequence, an extrapolated DMRS channel sequence that includes extrapolated DMRS channels that further extend the frequency range of the sequence of DMRS channels. The method may also include interpolating a data channel based on the augmented DMRS channel sequence. Various other methods and systems are also disclosed.

20 Claims, 15 Drawing Sheets

(56) References Cited

U.S. PATENT DOCUMENTS

| | | | |
|---|---|---|---|
| 2020/0221435 A1* | 7/2020 | Kim | H04L 5/0048 |
| 2021/0176097 A1* | 6/2021 | Zheng | H04W 72/30 |
| 2021/0320823 A1* | 10/2021 | Ernström | H04L 25/0212 |
| 2022/0021502 A1* | 1/2022 | Horn | H04L 5/0051 |
| 2022/0085939 A1* | 3/2022 | Mondal | H04W 72/21 |
| 2023/0412447 A1* | 12/2023 | Chen | H04L 27/2647 |
| 2023/0421217 A1* | 12/2023 | Chivate | H04B 7/0617 |
| 2024/0022371 A1* | 1/2024 | Kumar | H04L 5/0051 |
| 2025/0193051 A1* | 6/2025 | Li | H04L 25/0224 |

* cited by examiner

Back-to-Time $s(n) = iFFT(H), n = -\frac{Nifft}{2} + 1, -\frac{Nifft}{2} + 2, \ldots, -1, 0, 1, \ldots, Nifft/2$

Windowing $h(n) = s(n)w(n)$

Window $w(n)$ Width Covers up to Extended and Extrapolated Edge (Artificial DMRS). $w(n)$ can be Hamming or Others with Small Ripples in the Pass Band

SYSTEMS AND METHODS FOR DATA CHANNEL ESTIMATION IN FIFTH GENERATION NEW RADIO PHYSICAL UPLINK SHARED CHANNELS

CROSS-REFERENCE TO RELATED APPLICATION

This application claims the benefit of U.S. Provisional Patent Application No. 63/326,232, filed Mar. 31, 2022, the disclosure of which is incorporated, in its entirety, by this reference.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
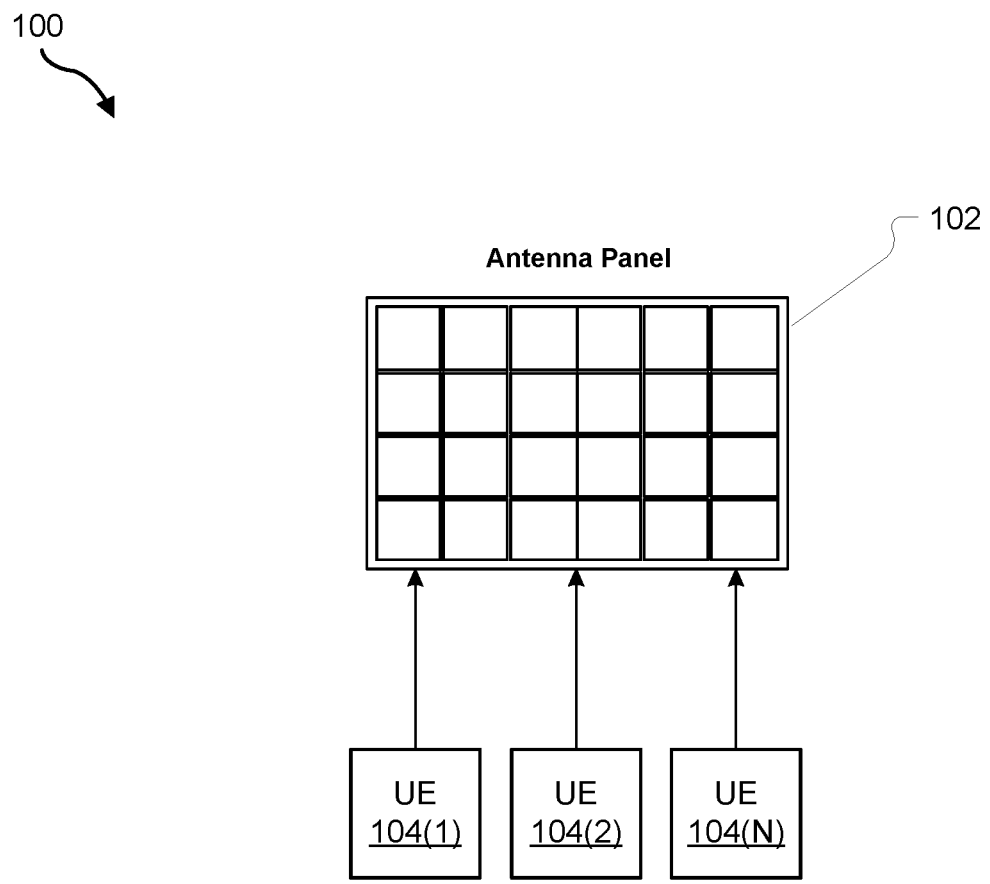
FIG. 1 shows a block diagram of a Multiple-Input Multiple-Output (MIMO) system that includes an antenna panel that may receive radiations from one or more user equipment devices (UE).

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

New Radio (NR) is a radio access technology (RAT) developed by the 3rd Generation Partnership Project (3GPP) for the fifth generation (5G) mobile network. In 5G NR, a physical uplink shared channel (PUSCH) is a physical uplink channel that carries user data from a UE device to a base station (BS). A DMRS is a reference signal associated with PUSCH. DMRS is used for channel estimation as part of coherent demodulation of PUSCH. The DMRS, known to both the BS and the UE, is sent by the UE, and is used by the BS receiver to acquire a propagation channel to recover data from each UE.

The time-frequency structure of DMRS depends on the type of waveform configured for PUSCH, as defined in 3rd Generation Partnership Project; Technical Specification Group Radio Access Network (TS) 38.211 "NR; Physical channels and modulation," §§ 6.4.1.1 and 6.4.1.2. The basic transmission scheme in LTE is orthogonal frequency-division multiplexing (OFDM). NR supports a flexible OFDM numerology with subcarrier spacings ranging from 15 kHz up to 240 kHz with a proportional change in cyclic prefix (CP) duration.

In general, an uplink (UL) RB is the smallest resource allocation unit, which is 12 resource elements (RE) in the frequency domain and up to 14 symbols per slot. The frequency separation between REs may be referred to as sub-carrier spacing (SCS). As mentioned above, SCS may be $15 \times 2^{\mu}$ KHz, such that $\mu=0, 1, 2, 3, 4$, resulting in SCS values of 15 KHz, 30 KHz, 60 KHz, 120 KHz, and 240 KHz, respectively. A symbol duration $T_s$ may be related to SCS by $$T_s = \frac{1}{SCS}$$

Each symbol has a cyclic prefix (CP) with a duration related to SCS or $\mu$.

PUSCH supports two different mapping types called Type A and Type B. In Type A mapping, the DMRS location may be fixed to the third or fourth position, with the starting symbol always at position 0. In Type A mapping, the PUSCH length may be 4~14 symbols. In Type B Mapping, the DMRS location is fixed to the first symbol of the allocated PUSCH. The PUSCH starting symbol may be at 0~12 and PUSCH length may be 2~14 symbols.

A dmrs-AdditionalPosition parameter may indicate one or more additional DMRS positions within a slot for the PUSCH. The DMRS positions are defined by the standard and depend on various factors like the transmission configuration and other parameters. The dmrs-AdditionalPosition parameter allows for additional DMRS positions to improve channel estimation and equalization, especially when the channel conditions are challenging or when a higher level of reliability is required.

The dmrs-AdditionalPosition parameter can have values such as 0, 1, 2, or 3, which indicate the additional DMRS positions within a slot, relative to the default DMRS position. These additional positions help enhance the system's robustness under different channel conditions.

For dmrs-AdditionalPosition=0, data channel estimation on all data symbols is equal to the DMRS channel estimation. For dmrs-AdditionalPosition=1, two DMRS positions are in a slot and used to interpolate for data channel estimation. For dmrs-AdditionalPosition=2 and dmrs-AdditionalPosition=3, three or four DMRS positions are in a slot and used to interpolate for data channel estimation. The last two or three DMRS are evenly spaced. The spacing of the first two DMRS may not be equal to the rest of the DMRS spacings, but the difference is only one symbol more or one symbol less.

For dmrs-AdditionalPosition=0, data channel estimation may simply be a duplication of the DMRS channel estimation. In this case, it may be that nothing else can be done to improve performance. Generally configured for either slow fading, low Quadrature Amplitude Modulation (QAM) order, or a small number of packets, a performance impact of dmrs-AdditionalPosition=0 may often be insignificant or tolerable for the system. However, for dmrs-AdditionalPosition greater than zero, the data channel estimations must be interpolated from the DMRS channel estimation.

A conventional method for data channel estimation that may include an operation of phase alignment to the first DMRS symbol, an operation of interpolation to data symbols, and a phase recovery operation. In at least one example, the DMRS channel is initially phase aligned to the first DMRS symbol. When more than one DMRS is in a slot, a phase rotation relative to the first DMRS is calculated and removed. Next, a data channel is interpolated from the DMRS. In some examples, the interpolation may be linear. In additional examples, the interpolation may be determined based on a solution to a minimum mean square error (MMSE) equation. A phase recovery operation may then be executed to recover the phase to before the phase alignment, with an assumption of a linear phase between the DMRS symbols.

Unfortunately, this conventional solution may not be optimal. The phase and amplitude decouple handling already concedes optimality, and the interpolation with MMSE may be optimal in terms of combining without considering phase. However, the conventional phase alignment and phase recovery operations include an assumption of a linear phase between two DMRS that considers only two adjacent DMRS channels for a data channel estimate, while the combining considers all DMRS channels. Hence, this application identifies and addresses a need for an improved data Channel estimation operation, especially for dmrs-AdditionalPosition=2 and dmrs-AdditionalPosition=3, as well as for higher order modulation such as 16 QAM, 64 QAM, and 256 QAM.

This disclosure is generally directed to systems and methods for improving data channel estimation in 5G-NR PUSCH communications. As described in greater detail below, this disclosure describes a new technique that introduces DMRS channel extension and DMRS channel extrapolation to create artificial DMRS channels with the same statistics of the estimated DMRS channels. These artificial DMRS channels may be added to one or both sides of the estimated DMRS channels. In some examples, the increased DMRS channels (i.e., the artificial DMRS channels) may allow simple low-pass interpolation filters to interpolate the data channel estimation. In additional examples, the bandwidth of the low-pass interpolation filter may be determined based on a measured Doppler from the estimated DMRS channel.

Hence, in at least one example, embodiments of the systems and methods disclosed herein may receive, as part of a DMRS channel estimation operation, a frequency-domain channel estimation signal. The channel estimation signal may include a sequence of DMRS channels. Some embodiments may also, based on the sequence of DMRS channels, generate an augmented DMRS channel sequence. Generating the augmented DMRS channel sequence may include generating, based on an edge DMRS channel and an additional DMRS channel included in the sequence of DMRS channels, an extended DMRS channel sequence that may include a plurality of extended DMRS channels that extend a frequency range of the sequence of DMRS channels. Generating the augmented DMRS channel sequence may also include generating, based on at least one interpolation matrix and the extended DMRS channel sequence, an extrapolated DMRS channel sequence that may include a plurality of extrapolated DMRS channels that further extend the frequency range of the sequence of DMRS channels. Embodiments may also interpolate, via a low-pass filter sampled at a sample interval, a data channel based on the augmented DMRS channel sequence.

The systems and methods disclosed herein may have many benefits over conventional systems for data channel estimation. For example, a DMRS channel extended and/or extrapolated in accordance with the systems and methods described herein may enable a simple low-pass filter to interpolate a data channel. These systems and methods may significantly improve data channel estimation, particularly for dmrs-AdditionalPosition=2, dmrs-AdditionalPosition=3, and for higher order modulation such as 16 QAM, 64 QAM, and 256 QAM.

The following will provide, with reference to FIGS. 1-5 and FIGS. 7-15, detailed descriptions of systems for improving data channel estimation. Detailed descriptions of corresponding computer-implemented methods will also be provided in connection with FIG. 6.

In general, massive MIMO systems use one or more antenna panels to receive radiations from multiple UEs, each sending a signal over the same radio resources. Data from a UE can be sent with one or more antenna ports. Each UE is allocated one or more unique antenna ports by a BS. FIG. 1 shows a block diagram of a MIMO system 100 that includes an antenna panel 102 that may receive radiations from one or more UE 104 (e.g., UE 104(1), UE 104(2), UE 104(N)). Note that although FIG. 1 shows three UEs, this is provided by way of example only and a MIMO system 100 may include any suitable number of UE devices.

Figure 2:
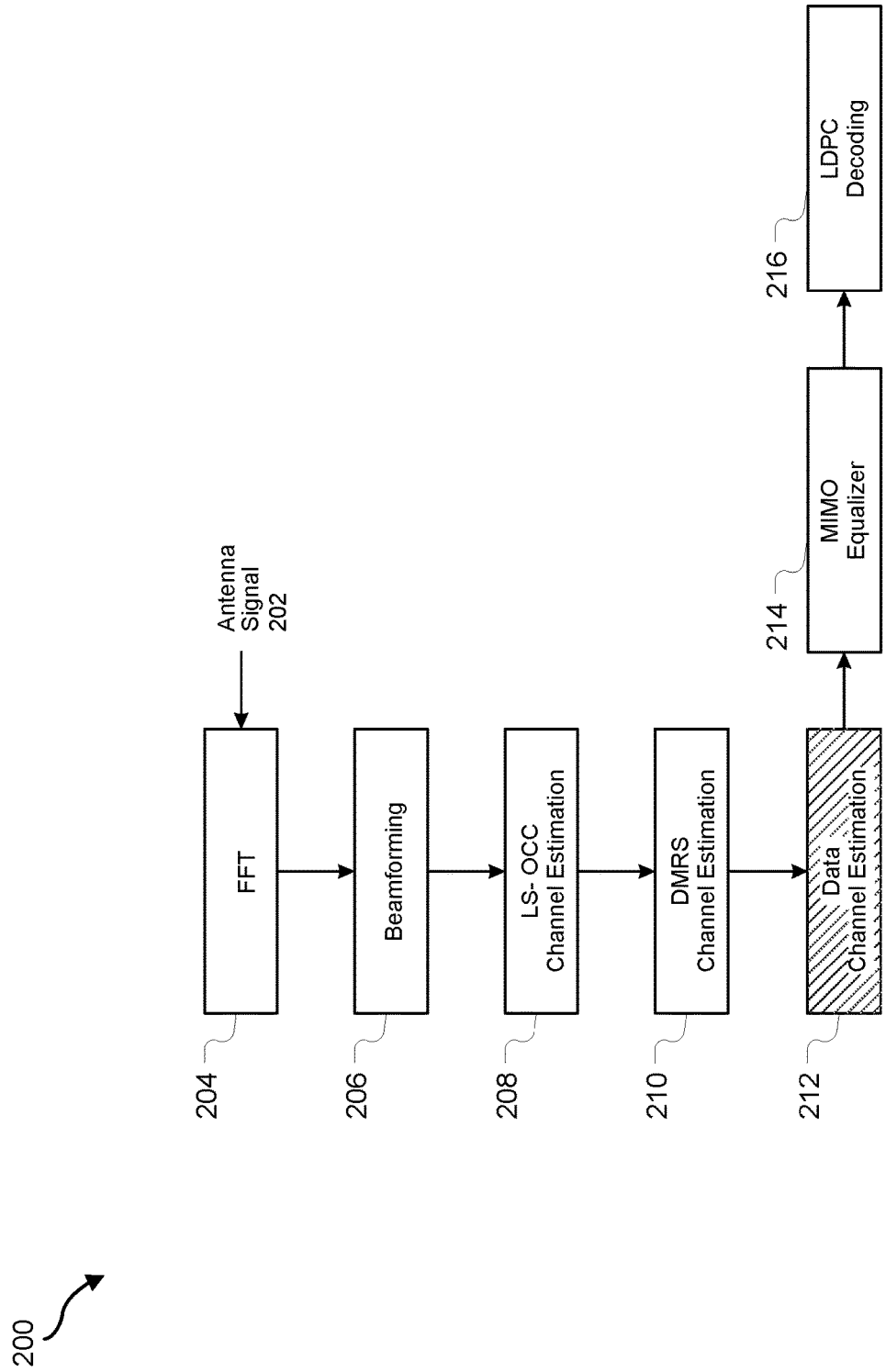
FIG. 2 shows a flow diagram for an example MIMO processing chain.

FIG. 2 shows a flow diagram for an example MIMO processing chain 200. As shown, the example massive MIMO processing chain 200 may include operations of receiving of an antenna signal 202, a fast Fourier transform (FFT) operation 204, a beamforming operation 206, an LS OCC channel estimation operation 208, a DMRS channel estimation operation 210, a data channel estimation operation 212, a MIMO equalizer operation 214, and a low-density parity check code (LDPC) decoding operation 216. In general, the systems and methods disclosed herein relate to the data channel estimation operation 212.

Figure 3:
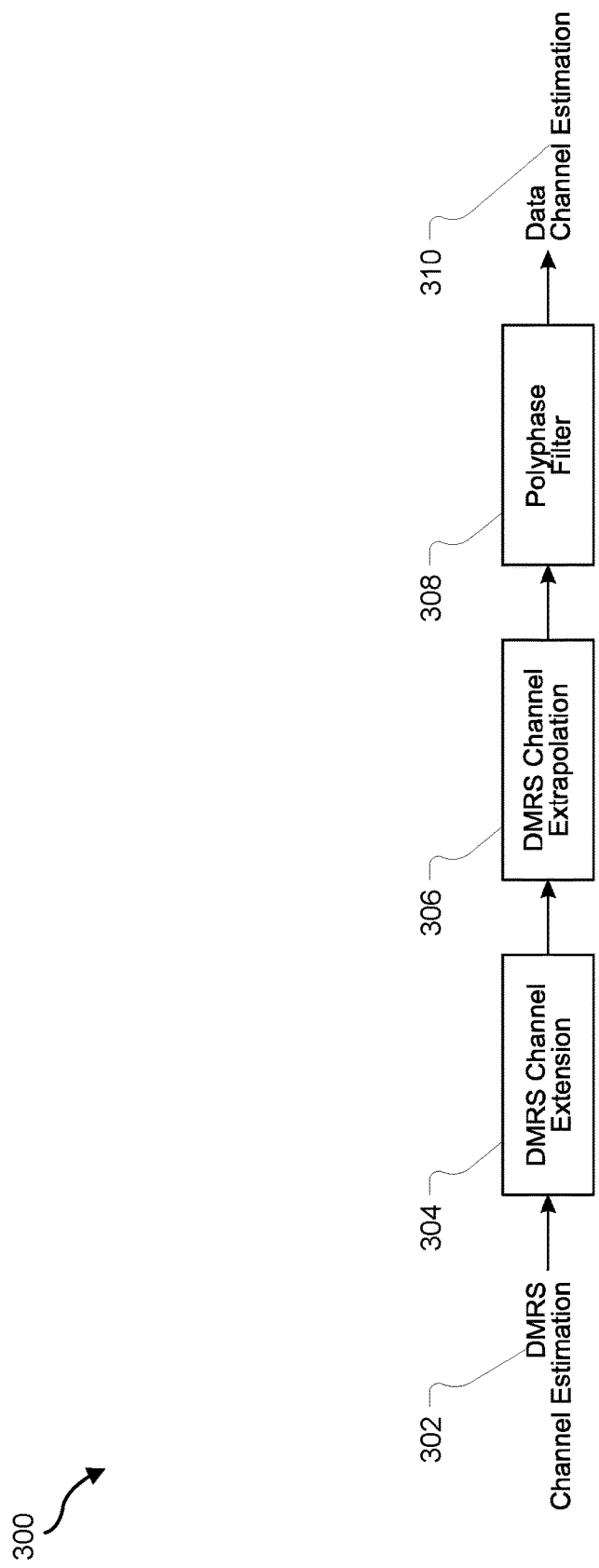
FIG. 3 provides a flow diagram that shows a high-level architecture of a procedure for data channel estimation.

FIG. 3 provides a flow diagram 300 that shows a high-level architecture of a method and/or system for data channel estimation. As shown, embodiments of the systems and methods described herein may receive a DMRS channel estimation signal 302, perform a DMRS channel extension operation 304, execute a DMRS channel extrapolation operation 306, and apply a polyphase filtering operation 308 to generate a data channel estimation signal 310. Additional descriptions of each of these operations will be provided below in reference to FIG. 7 through FIG. 15.

Figure 4:
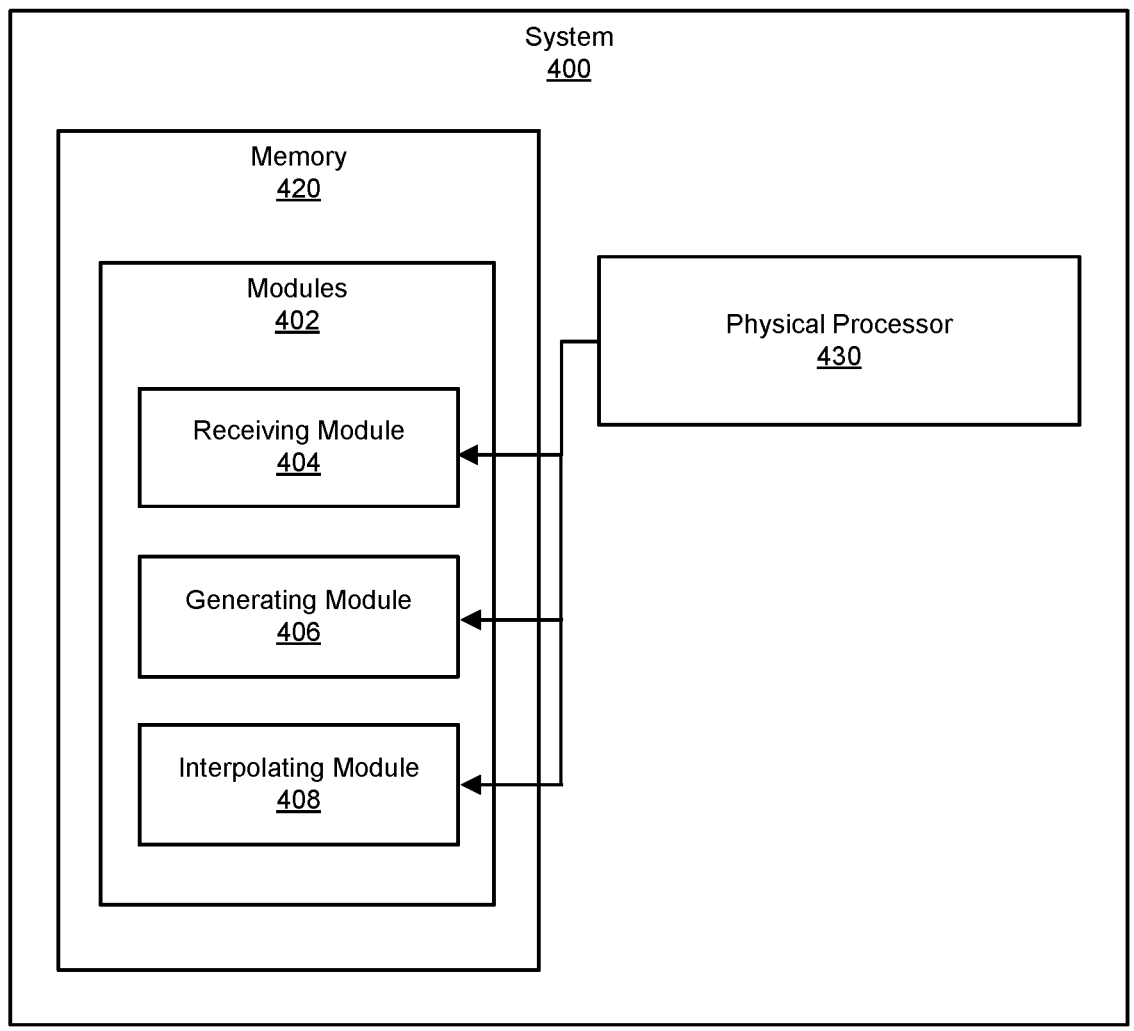
FIG. 4 is a block diagram of an example system for improving data channel estimation.

FIG. 4 is a block diagram of an example system 400 for improving data channel estimation. As illustrated in this figure, example system 400 may include one or more modules 402 for performing one or more tasks. As will be explained in greater detail below, modules 402 may include a receiving module 404 that receives, as part of a data channel estimation operation, a frequency-domain channel estimation signal that may include a sequence of DMRS channels.

Example system 400 may also include a generating module 406 that generates, based on the sequence of DMRS channels, an augmented DMRS channel sequence. In some examples, generating module 406 may generate the augmented DMRS channel sequence by generating, based on an edge DMRS channel and an additional DMRS channel included in the sequence of DMRS channels, an extended DMRS channel sequence that may include a plurality of extended DMRS channels that extend a frequency range of the sequence of DMRS channels. Additionally, generating module 406 may generate the augmented DMRS channel by also generating, based on at least one interpolation matrix and the extended DMRS channel sequence, an extrapolated DMRS channel sequence. The extrapolated DMRS channel sequence may include a plurality of extrapolated DMRS channels that further extend the frequency range of the sequence of DMRS channels.

As further illustrated in FIG. 4, example system 400 may also include an interpolating module 408 that interpolates, via a low-pass filter sampled at a sample interval, a data channel based on the augmented DMRS channel sequence.

As also illustrated in FIG. 4, example system 400 may also include one or more memory devices, such as memory 420. Memory 420 generally represents any type or form of volatile or non-volatile storage device or medium capable of storing data and/or computer-readable instructions. In one example, memory 420 may store, load, and/or maintain one or more of modules 402. Examples of memory 420 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 4, example system 400 may also include one or more physical processors, such as physical processor 430. Physical processor 430 generally represents any type or form of hardware-implemented processing unit capable of interpreting and/or executing computer-readable instructions. In one example, physical processor 430 may access and/or modify one or more of modules 402 stored in memory 420. Additionally or alternatively, physical processor 430 may execute one or more of modules 402 to facilitate improving of data channel estimation in 5G NR PUSCH. Examples of physical processor 430 include, without limitation, microprocessors, microcontrollers, central processing units (CPUs), Field-Programmable Gate Arrays (FPGAs) that implement softcore processors, Application-Specific Integrated Circuits (ASICs), digital signal processors (DSPs), portions of one or more of the same, variations or combinations of one or more of the same, or any other suitable physical processor.

Figure 5:
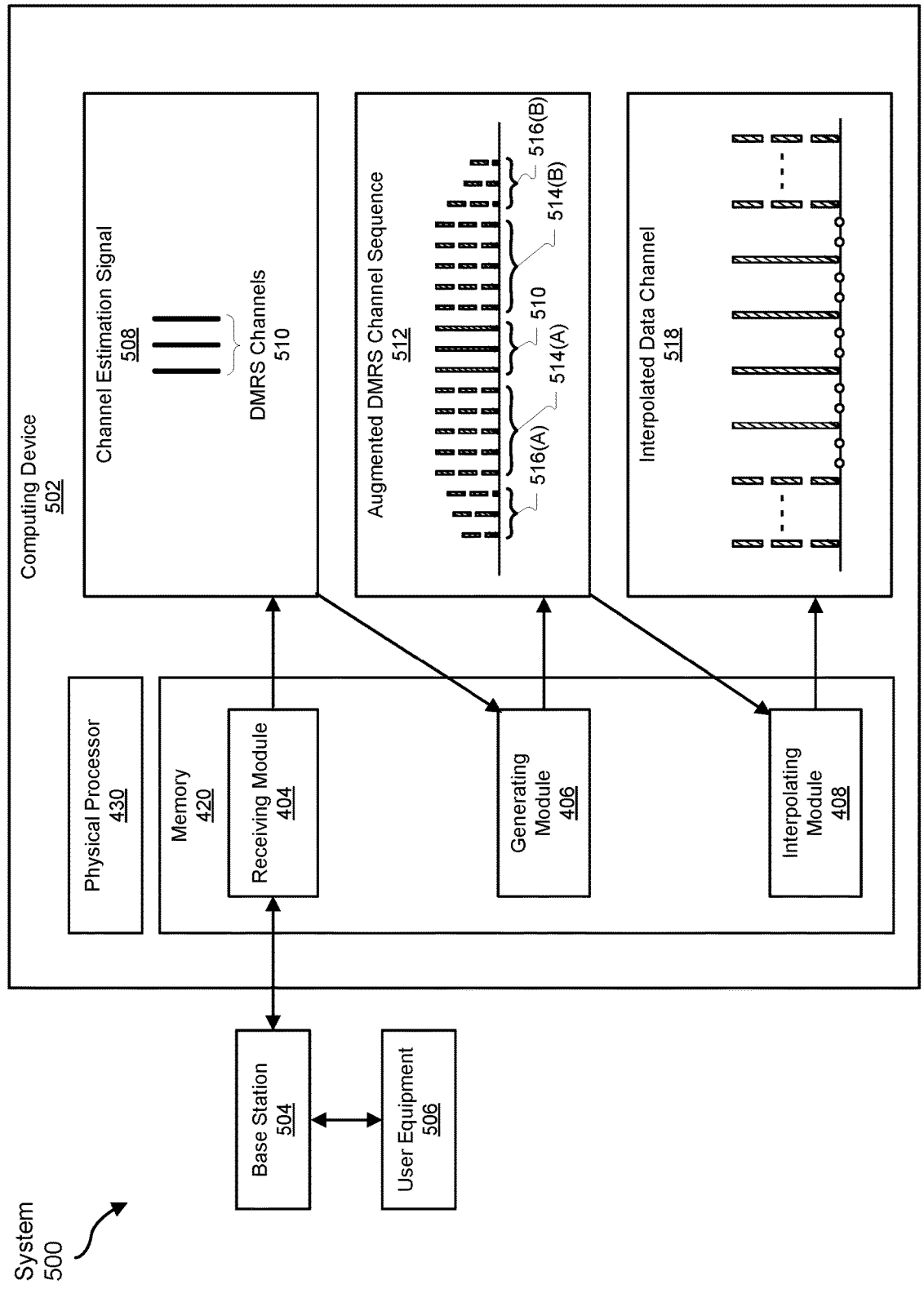
FIG. 5 is a block diagram of an example system that implements a system for improving data channel estimation.

Example system 400 in FIG. 4 may be implemented in a variety of ways. For example, all or a portion of example system 400 may represent portions of an example system 500 ("system 500") in FIG. 5. As shown in FIG. 5, system 500 may include a computing device 502 in communication with a base station 504. Base station 504 may further be in communication with a user equipment 506. In at least one example, computing device 502 may be programmed with one or more of modules 402.

In at least one embodiment, one or more of modules 402 from FIG. 4 may, when executed by computing device 502, enable computing device 502 to perform one or more operations to improve data channel estimation. For example, as will be described in greater detail below, receiving module 404 may cause computing device 502 to receive, as part of a data channel estimation operation (e.g., data channel estimation operation 210), a frequency-domain channel estimation signal (e.g., DMRS channel estimation signal 508) that may include a sequence of DMRS channels (e.g., DMRS channels 510).

Additionally, generating module 406 may cause computing device 502 to generate, based on the sequence of DMRS channels, an augmented DMRS channel sequence (e.g., DMRS channels 510). In some examples, generating module 406 may cause computing device 502 to generate the augmented DMRS channel sequence by generating, based on an edge DMRS channel and an additional DMRS channel included in the sequence of DMRS channels, an extended DMRS channel sequence (e.g., extended DMRS channel sequence 514(A) and extended DMRS channel sequence 514(B)) that may include a plurality of extended DMRS channels that extend a frequency range of the sequence of DMRS channels. Additionally, in some examples, generating module 406 may cause computing device 502 to generate the augmented DMRS channel sequence by further generating, based on at least one interpolation matrix and the extended DMRS channel sequence, an extrapolated DMRS channel sequence (e.g., extrapolated DMRS channel sequence 516(A) and extrapolated DMRS channel sequence 516(B)). In some examples, the extrapolated DMRS channel sequence may include a plurality of extrapolated DMRS channels that further extend the frequency range of the sequence of DMRS channels.

Moreover, as will be described in greater detail below, interpolating module 408 may cause computing device 502 to interpolate, via a low-pass filter sampled at a sample interval, a data channel based on the augmented DMRS channel sequence.

Computing device 502 generally represents any type or form of computing device capable of reading and/or executing computer-executable instructions and/or hosting executables. Examples of computing device 502 include, without limitation, application servers, storage servers, database servers, web servers, signal processing devices, and/or any other suitable computing device configured to run certain software applications and/or provide various application, storage, and/or signal processing services.

In at least one example, computing device 502 may be a computing device programmed with one or more of modules 402. All or a portion of the functionality of modules 402 may be performed by computing device 502 and/or any other suitable computing system. As will be described in greater detail below, one or more of modules 402 from FIG. 4 may, when executed by at least one processor of computing device 502, enable computing device 502 to improve DMRS channel estimation by reducing edge effects for one or more signals used for a DMRS channel estimation process.

Base station 504 may generally represent an element within a wireless communication system (e.g., system 500) that provides radio coverage and connectivity to user equipment (e.g., user equipment 506) within a specific area or cell. A 5G base station may also be referred to as a gNodeB (gNB). Base station 504 may include a variety of components including, without limitation, an antenna array, a transceiver unit, and one or more baseband processing units. The antenna array may be used to transmit and receive radio signals, while the transceiver unit may be responsible for processing the signals and converting them to digital data that can be sent to the baseband processing units. The baseband processing units may be responsible for performing signal processing, error correction, and modulation and demodulation of the signals. Although not so illustrated in FIG. 5, in some examples, computing device 502 may be included as part of base station 504 and/or may be in communication with one or more components of base station 504.

User equipment 506 may include any mobile device or endpoint that connects to a 5G network to access various services, such as voice, video, and data communication. user equipment 506 can be a smartphone, tablet, laptop, or any other wireless device that is designed to operate with 5G networks. In some examples, user equipment 506 may include a 5G modem, one or more antennas, and/or any other suitable hardware that may facilitate communication with base station 504.

Many other devices or subsystems may be connected to system 400 in FIG. 4 and/or system 500 in FIG. 5. Conversely, all of the components and devices illustrated in FIGS. 3 and 4 need not be present to practice the embodiments described and/or illustrated herein. The devices and subsystems referenced above may also be interconnected in different ways from those shown in FIG. 5. Systems 400 and 500 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 6:
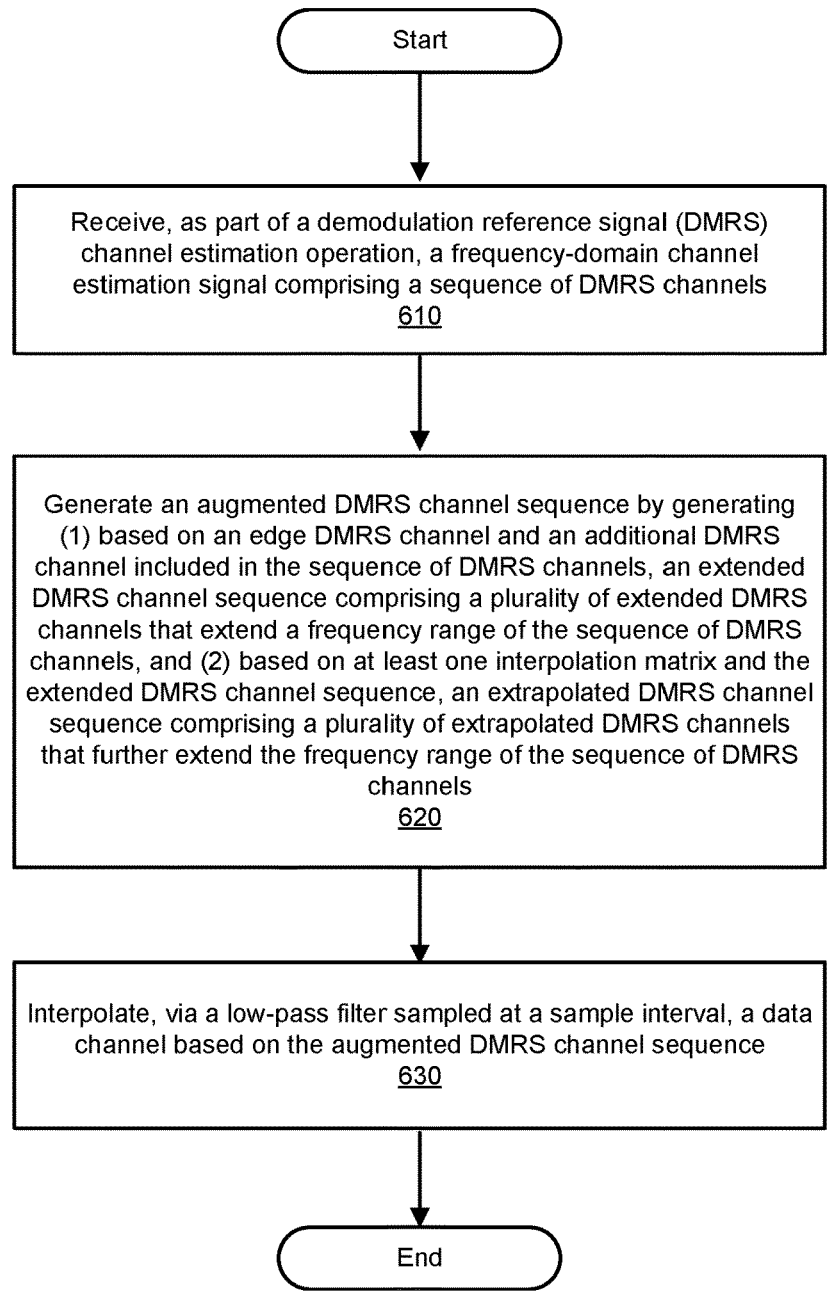
FIG. 6 is a flow diagram of an example computer-implemented method for improving data channel estimation.
Figure 7:
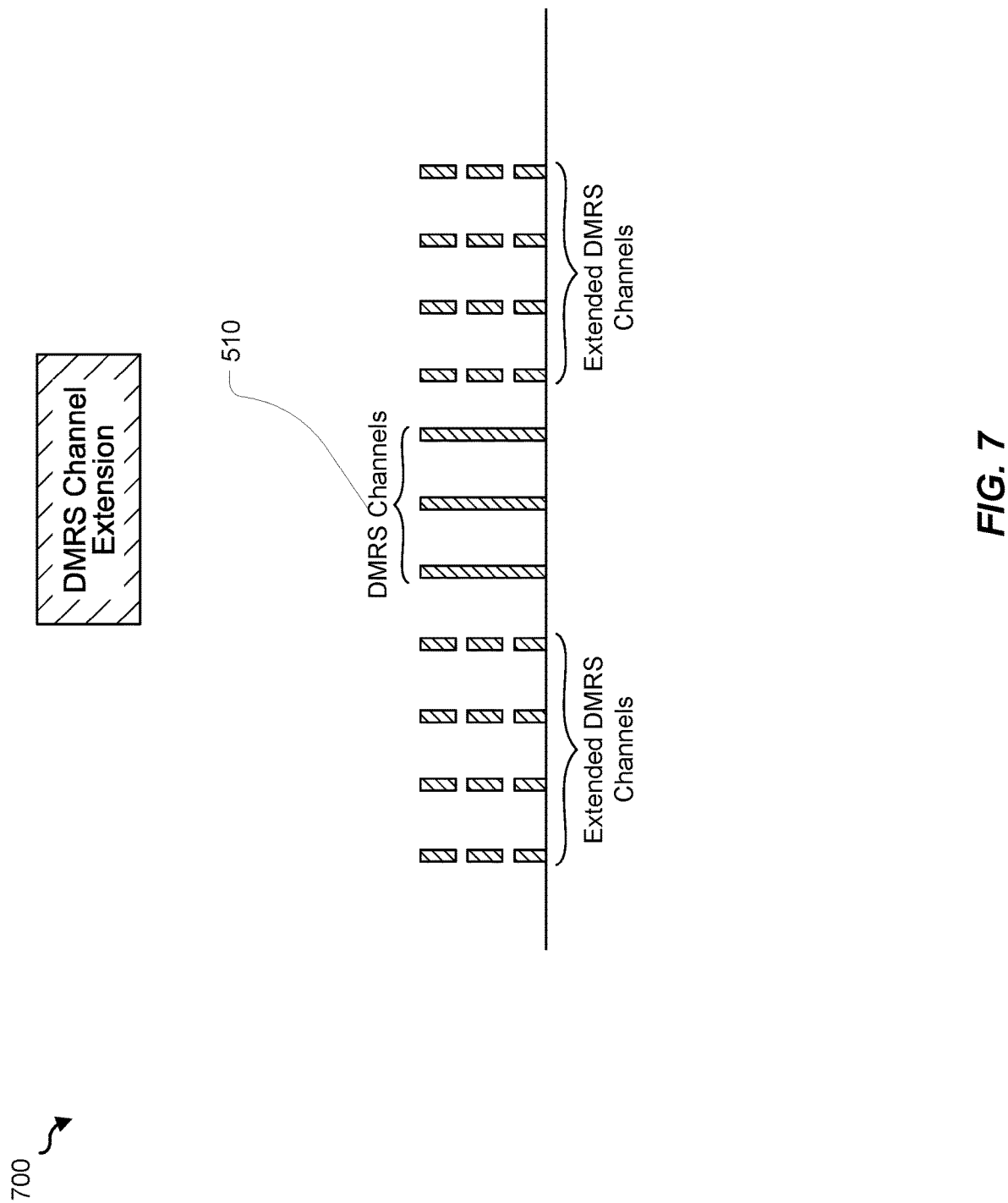
FIG. 7 includes a diagram that illustrates a demodulation reference signal (DMRS) channel extension operation FIG. 8 includes a diagram that may illustrate generation of an extended DMRS channel sequence for dmrs-AdditionalPosition=1.
Figure 8:
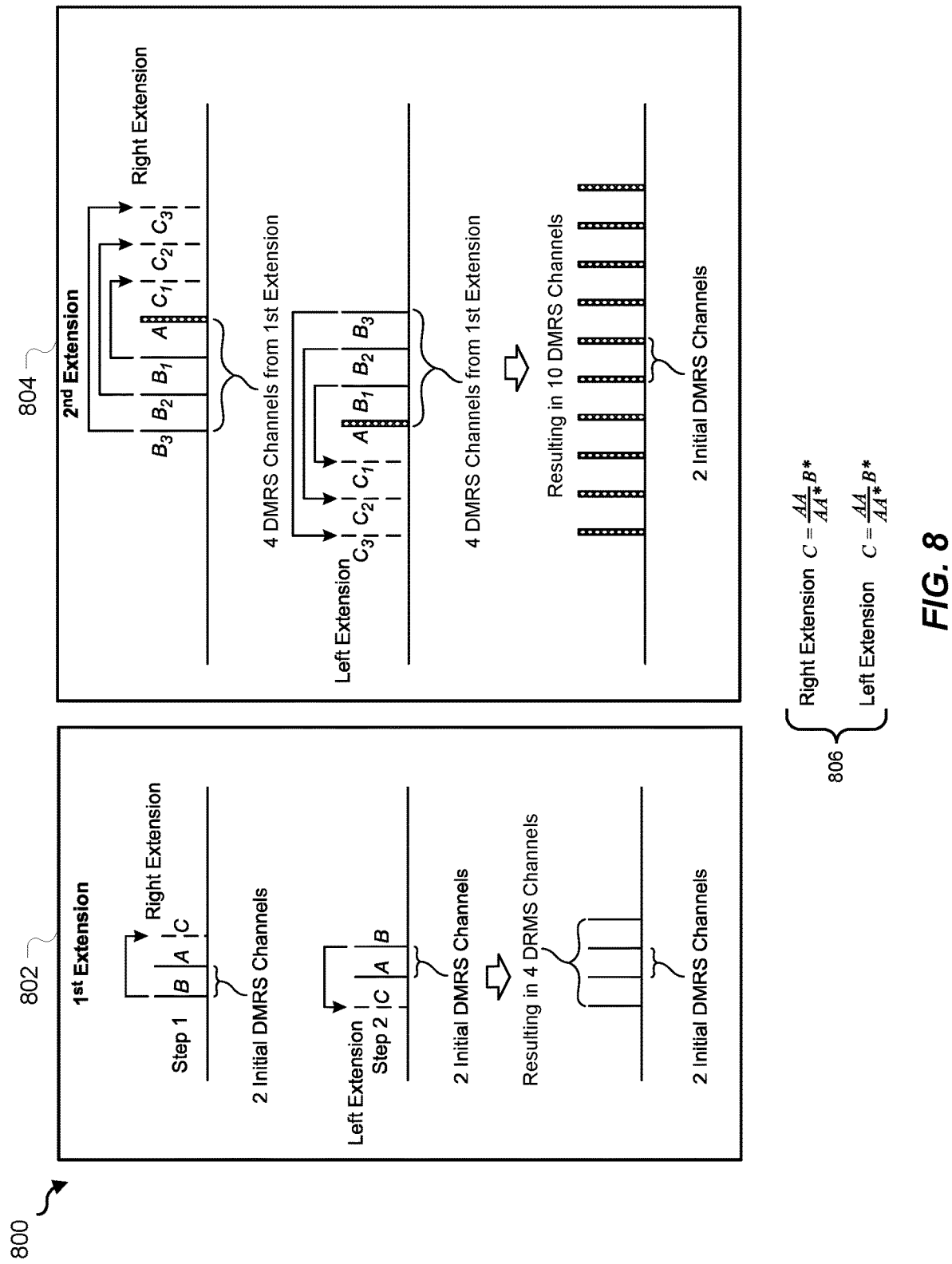

FIG. 6 is a flow diagram of an example computer-implemented method 600 for improving data channel estimation. The steps shown in FIG. 6 may be performed by any suitable computer-executable code and/or computing system, including system 400 in FIG. 4, system 500 in FIG. 5, and/or variations or combinations of one or more of the same. In one example, each of the steps shown in FIG. 6 may represent an algorithm whose structure includes and/or is represented by multiple sub-steps, examples of which will be provided in greater detail below.

As illustrated in FIG. 6, at step 610, one or more of the systems described herein may receive, as part of a data channel estimation operation, a frequency-domain channel estimation signal that may include a sequence of DMRS channels. For example, receiving module 404 may, as part of computing device 502, cause computing device 502 to receive DMRS channel estimation signal 508 that may include DMRS channels 510.

Receiving module 404 may cause computing device 502 to receive channel estimation signal 508 in a variety of contexts. For example, user equipment 506 may seek to establish an uplink with base station 504. User equipment 506 may send a DMRS to base station 504 as part of the uplink transmission. As mentioned above, the DMRS contains a specific pattern of bits that may allow base station 504 to identify and extract the signal from the received waveform. The DMRS may help to mitigate the effects of interference and noise in the wireless channel and improve the reliability and performance of the communication system.

As mentioned above in reference to FIG. 2, a base station (e.g., base station 504) may perform one or more processes on a received antenna signal (e.g., antenna signal 202) prior to a DMRS channel estimation operation (e.g., DMRS channel estimation operation 210). For example, as shown in FIG. 2, a base station may perform an FFT operation (e.g., FFT operation 204), a beamforming operation (e.g., beamforming operation 206), and an LS OCC channel estimation operation (e.g., LS OCC channel estimation operation 208) prior to passing a frequency domain channel estimation signal that includes a plurality of DMRS samples (e.g., channel estimation signal 508 that includes DMRS channels 510) as input to a DMRS channel estimation operation (e.g., DMRS channel estimation operation 210). LS OCC channel estimation operation 208 is to obtain a raw channel estimation signal for each pair of port(s) and antenna(s). Once LS OCC channel estimation operation 208 obtains the raw channel estimation signal, the raw channel estimation signal is passed to the DMRS channel estimation operation 210 to further process the raw channel estimation signal to improve the accuracy and reliability of data demodulation in the uplink transmission.

Following the DMRS channel estimation operation 210, the data channel estimation operation 212 may refine the channel estimation further by utilizing the output from the DMRS channel estimation. This operation leverages the improved DMRS-based channel estimation to obtain more precise estimates of the actual data channels, which is essential for decoding the transmitted data accurately.

Hence, receiving module 404 may cause computing device 502 to receive channel estimation signal 508 from one or more components of base station 504.

Returning to FIG. 6, at step 620, one or more of the systems described herein may generate, based on the sequence of DMRS channels, an augmented DMRS channel. For example, generating module 406 may, as part of computing device 502, cause computing device 502 to generate, based on DMRS channels 510, an augmented DMRS channel augmented DMRS channel sequence 512.

Generating module 406 may generate augmented DMRS channel sequence 512 in a variety of contexts. By way of illustration, FIG. 7 includes a diagram 700 that illustrates a DMRS channel extension operation. As shown, example, generating module 406 may generate augmented DMRS channel sequence 512 by generating, based on an edge DMRS channel and an additional DMRS channel included in DMRS channels 510, an extended DMRS channel sequence 514 (e.g., one or more of extended DMRS channel sequence 514(A) and/or extended DMRS channel sequence 514(B)). Extended DMRS channel sequence 514 may include a plurality (e.g., two or more) of DMRS channels and may extend a frequency range of DMRS channel estimation signal 508 and/or DMRS channels 510.

Generating module 406 may generate extended DMRS channel sequence 514 in any suitable way. As an example, FIG. 8 includes a diagram 800 that discloses and/or illustrates an edge extension algorithm for dmrs-AdditionalPosition=1. As mentioned above, when dmrs-AdditionalPosition=1, there may be two DMRS per slot. In the algorithm illustrated in diagram 802, the two initial DMRS channels may be extended to the right by one during a first step and may be extended to the left by one in a second step. This may result in four total DMRS channels.

Hence, in at least some examples, generating extended DMRS channel sequence 514 may include executing a first extension of the sequence of DMRS channels. The first extension may include a right extension of the sequence of DMRS channels, wherein the right extension may include (1) including the sequence of DMRS channels in the extended DMRS channel sequence, (2) designating, as a head DMRS channel (i.e., an edge of the DMRS channel sequence), a DMRS channel included in the sequence of DMRS channels having a highest frequency among DMRS channels included in the sequence of DMRS channels, (3) including, in a tail sequence of the sequence of DMRS channels, all DMRS channels included in the sequence of DMRS channels having a frequency lower than the highest frequency among DMRS channels included in the sequence of DMRS channels.

For a right extension, shown in diagram 806, generating module 406 may designate a DMRS channel having a highest frequency (e.g., a DMRS channel on a right edge of the sequence of DMRS channels) as a head DMRS channel A and may include all other DMRS channels in the DMRS sequence in a tail sequence. Then, for every DMRS channel in the tail sequence (e.g., for every DMRS channel B), determine an extended DMRS channel C based on a magnitude (e.g., a normalized power spectral density) of the head DMRS channel A and a complex conjugate of the DMRS channel B (e.g., $$C = \frac{AA}{AA^*} B^*(n)\Big)$$

and may include the extended DMRS channel C in the extended DMRS channel sequence. For a left extension, a DMRS channel having a lowest frequency (e.g., a DMRS channel on a left edge of the sequence of DMRS channels) may be designated as the head DMRS channel and all other DMRS channels may be included in the tail sequence of DMRS channels. As with the right extension, for the left extension, generating module 406 may, for each DMRS channel in the tail sequence (e.g., for every DMRS channel B) determine an extended DMRS channel C based on a magnitude (e.g., a normalized power spectral density) of the head DMRS channel A and a complex conjugate of the DMRS channel B (e.g., $$C = \frac{AA}{AA^*} B^*(n)\Big)$$

and may include the extended DMRS channel C in the extended DMRS channel sequence.

This general algorithm may apply for left and right extension when dmrs-AdditionalPosition=1, dmrs-AdditionalPosition=2, and dmrs-AdditionalPosition=3. Moreover, when dmrs-AdditionalPosition=1, as shown in diagram 804, generating module 406 may further execute a second extension (e.g., a second left extension and a second right extension) in accordance with the foregoing algorithm, designating DMRS channels included in the extended DMRS channel sequence after the first extension as an intermediate DMRS channel sequence. Hence, the four DMRS channels from the first extension may be further extended on the right side by three and on the left side by three, resulting in ten DMRS channel estimations from the two initial DMRS channel estimations.

Figure 9:
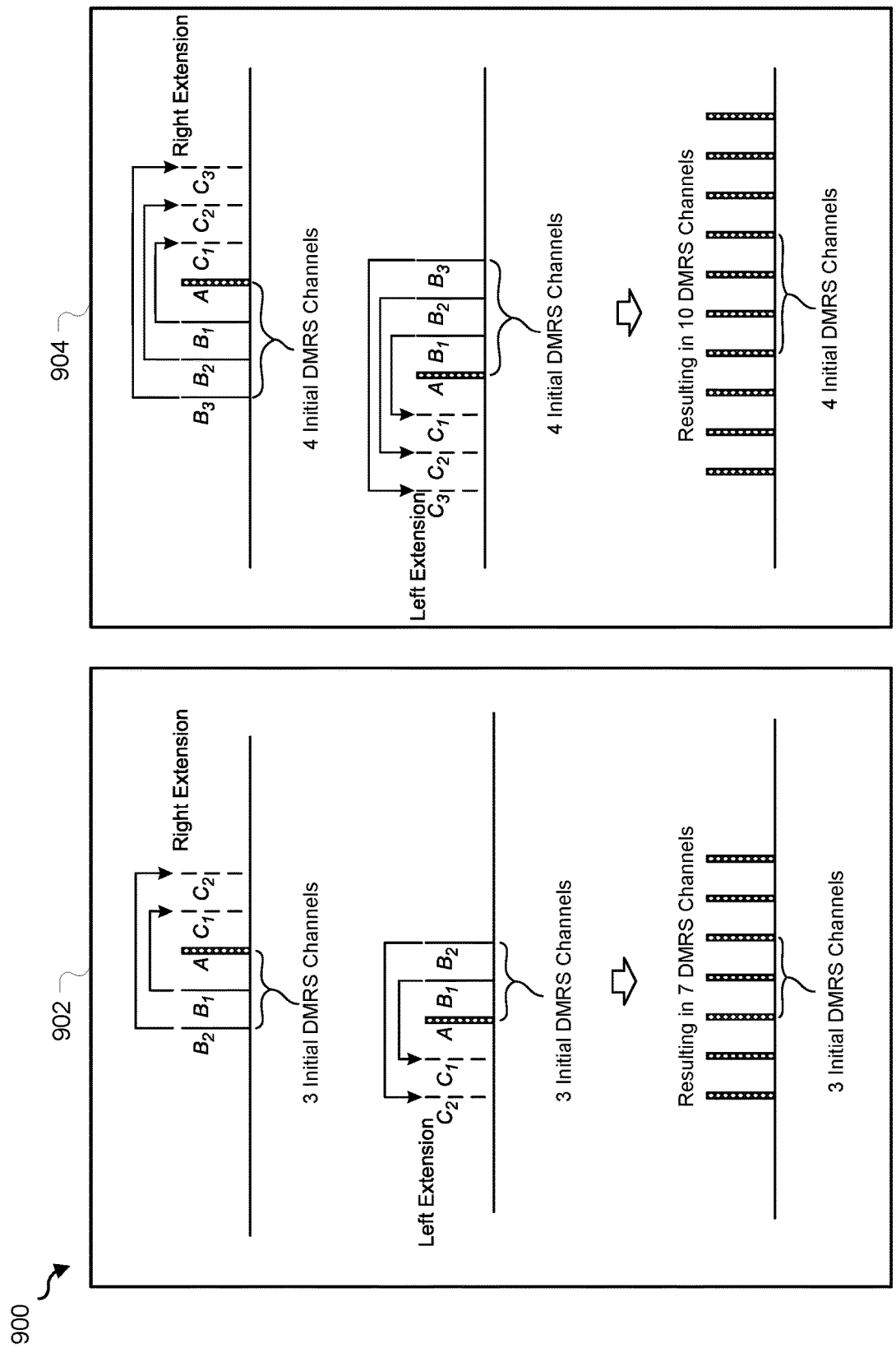
FIG. 9 includes a diagram that may illustrate generation of an extended DMRS channel sequence for dmrs-AdditionalPosition=2 and for dmrs-AdditionalPosition=3.

FIG. 9 includes a diagram 900 that may illustrate generation of an extended DMRS channel sequence for dmrs-AdditionalPosition=2 and for dmrs-AdditionalPosition=3. As mentioned above, when dmrs-AdditionalPosition=2, there may be three DMRS per slot. In the algorithm illustrated in diagram 902, the three initial DMRS channels may be extended to the right by two during a first step and may be extended to the left by two in a second step. This may result in seven total DMRS channels. In some examples, this one extension (to the right and to the left) may be sufficient.

When dmrs-AdditionalPosition=3, there may be four DMRS per slot. In the algorithm illustrated in diagram 904, the four initial DMRS channels may be extended to the right by three during a first step and may be extended to the left by three in a second step. This may result in ten total DMRS channels. In some examples, this one extension (to the right and to the left) may be sufficient.

Figure 10:
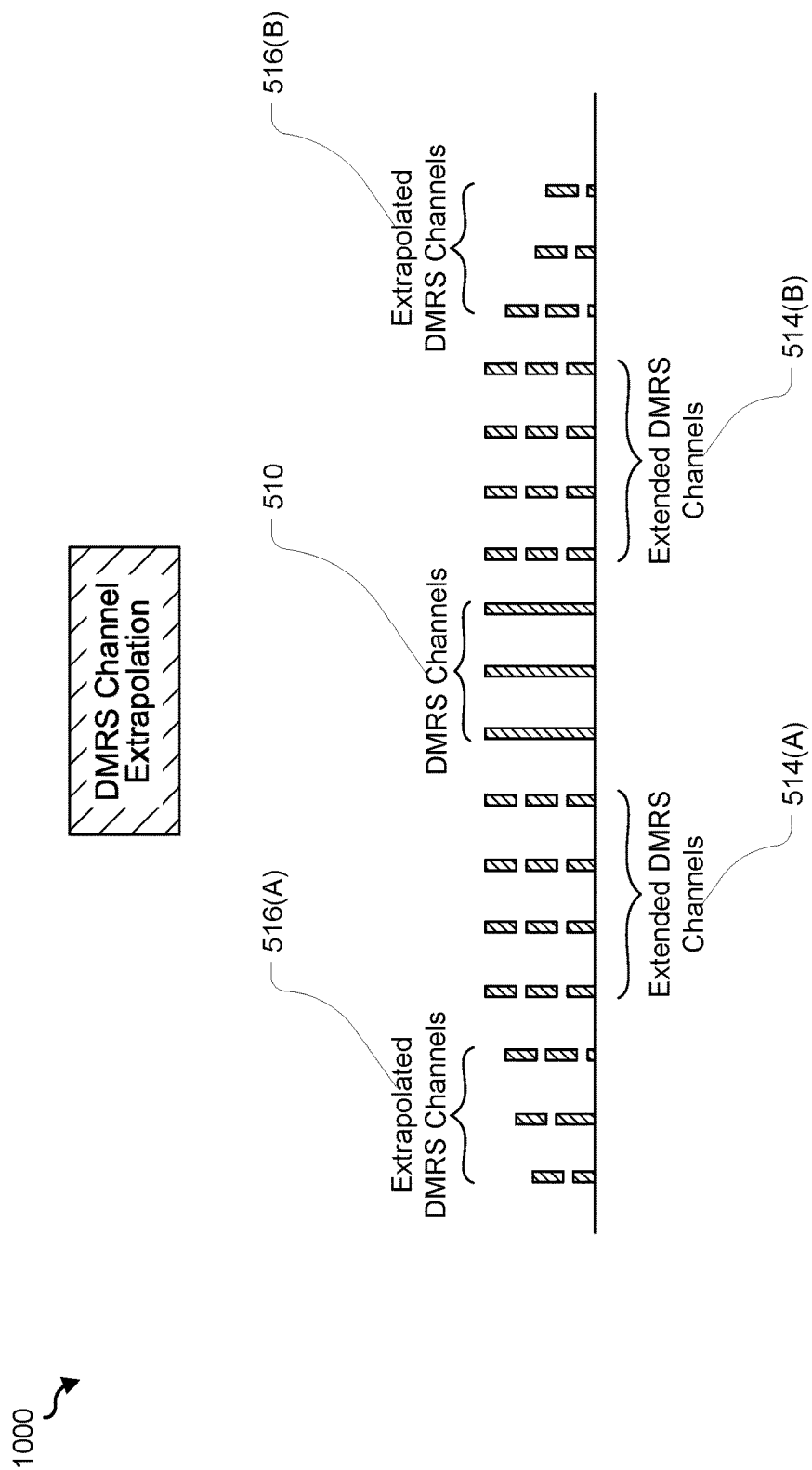
FIG. 10 shows a diagram that illustrates an extrapolated DMRS channel sequence that further extends a frequency range of a sequence of DMRS channels.

As mentioned above, in some embodiments, generating module 406 may further generate augmented DMRS channel sequence 512 by generating, based on at least one interpolation matrix and the extended DMRS channel sequence, an extrapolated DMRS channel sequence that may include a plurality of extrapolated DMRS channels that further extend the frequency range of the sequence of DMRS channels. FIG. 10 shows a diagram 1000 that illustrates extrapolated DMRS channel sequence 516 (e.g., extrapolated DMRS channel sequence 516(A) and extrapolated DMRS channel sequence 516(B)) that further extends the frequency range of DMRS channels 510 and extended DMRS channel sequence 514 (e.g., extended DMRS channel sequence 514(A) and extended DMRS channel sequence 514(B)).

Generating module 406 may generate extrapolated DMRS channel sequence 516 in any suitable way. For example, generating module 406 may apply (1) a left interpolation matrix to a left edge of extended DMRS channel sequence 514 (e.g., extended DMRS channel sequence 514(A) and/or DMRS channels 510) to generate a left extrapolated DMRS channel sequence (e.g., extrapolated DMRS channel sequence 516(A)), and (2) a right interpolation matrix to a right edge of the extended DMRS channel sequence (e.g., extended DMRS channel sequence 514(A) and/or DMRS channels 510) to generate a right extrapolated edge (e.g., extrapolated DMRS channel sequence 516(B)).

Figure 11:
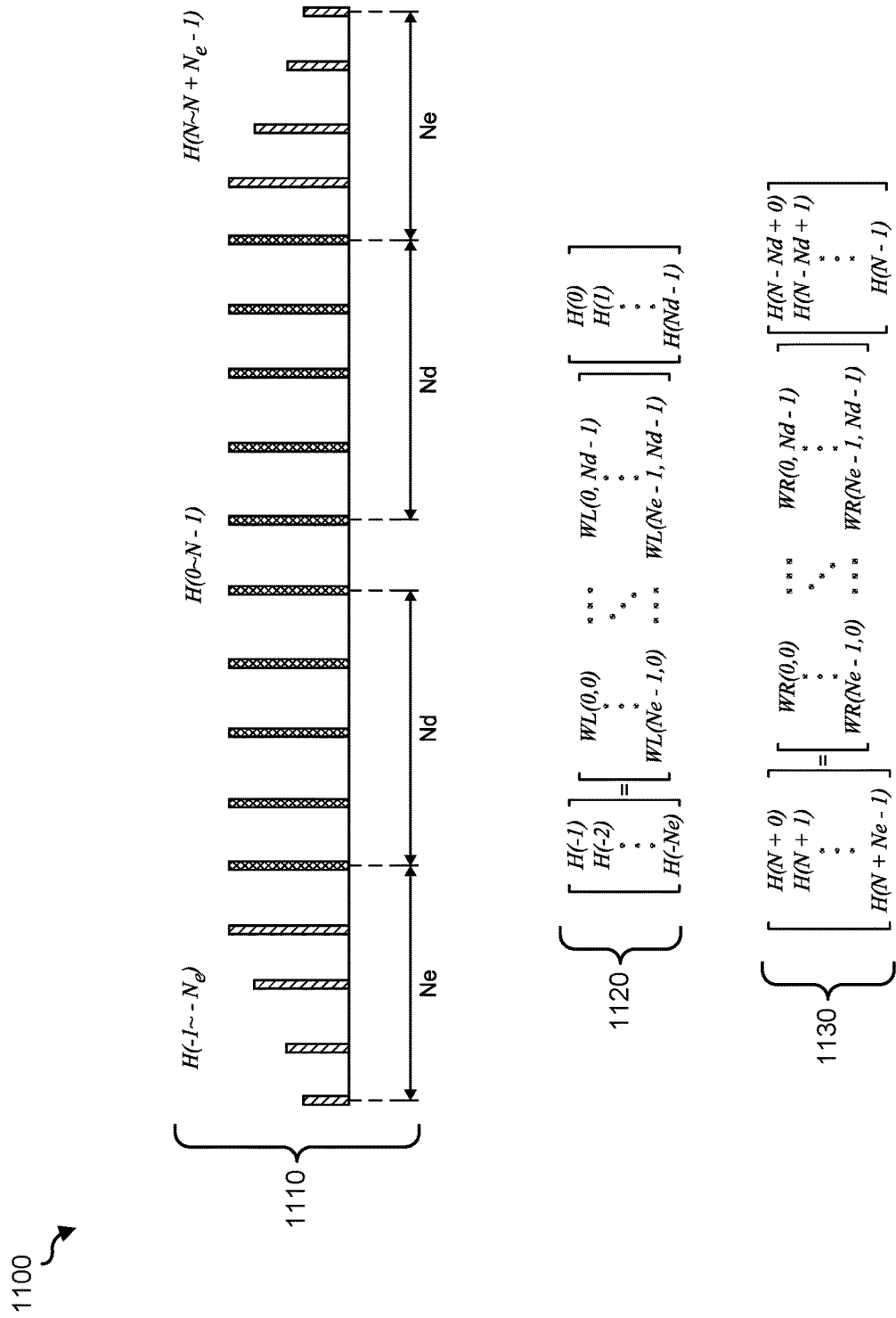
FIG. 11 illustrates an example DMRS channel extrapolation algorithm that may be applied, implemented, and/or executed within and/or by systems and methods described herein.

FIG. 11 includes a diagram 1100 that discloses and/or illustrates an example DMRS channel extrapolation algorithm that may be applied, implemented, and/or executed within and/or by systems and methods described herein. Chart 1110 may show various components of an augmented DMRS channel sequence (e.g., augmented DMRS channel sequence 512) that generating module 406 may generate by applying interpolation matrix 1120 and/or interpolation matrix 1130 to various portions of DMRS channels 510 and/or extended DMRS channel sequence 514. In the example illustrated by chart 1110, the edges may be extended by at least four samples on each side. In this embodiment, interpolation matrix interpolation matrix 1120 (e.g., $W_L$) and interpolation matrix 1130 (e.g., $W_R$ may be applied to different portions of the DMRS channel sequence (e.g., H(0~N−1)) to extrapolate right and left edges (e.g., H(N~N+N$_e$−1) and H(−1~−N$_e$), respectively).

In some examples, the interpolation matrices $W_L$ and $W_R$ may be pre-determined and/or pre-calculated and may be based on Weiner filter theory. A Wiener filter may be used to produce an estimate of a desired or target random process by linear time-invariant (LTI) filtering of an observed noisy process and additive noise, assuming a known stationary signal and noise spectra. A Wiener filter may minimize a mean square error (MSE) between an estimated random process and a desired process.

Returning to FIG. 6, at step 630, one or more of the systems described herein may interpolate, via a low-pass filter sampled at a sample interval, a data channel based on the augmented DMRS channel sequence. For example, interpolating module 408 may, as part of computing device 502, cause computing device 502 to interpolate, via a low-pass filter sampled at a sample interval, interpolated data channel 518 based on augmented DMRS channel sequence 512.

Figure 12:
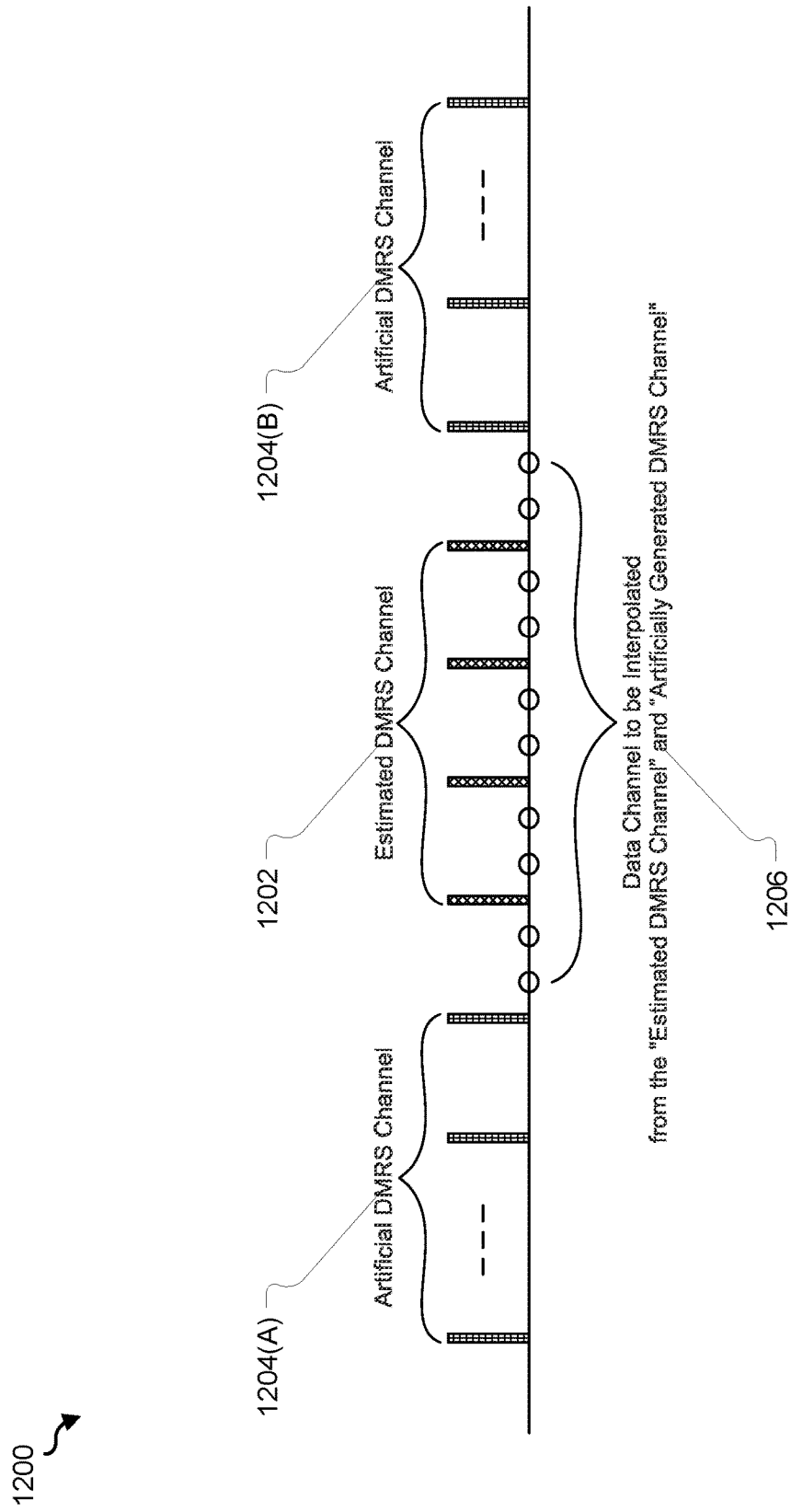
FIG. 12 shows a diagram 1200 that illustrates estimated DMRS channels, artificial DMRS channels, and an interpolated data channel.

In some examples, one or more of modules 402 (e.g., receiving module 404, generating module 406, and/or interpolating module 408) may further process augmented DMRS channel sequence 512 in preparation for interpolation of interpolated data channel 518. For example, interpolating module 408 may, prior to interpolating interpolated data channel 518 based on augmented DMRS channel sequence 512, divide augmented DMRS channel sequence 512 into a first artificial DMRS channel sequence, an estimated DMRS channel sequence, and a second artificial DMRS channel sequence. FIG. 12 shows a diagram 1200 that illustrates an estimated DMRS channel 1202, an artificial DMRS channel 1204(A), an artificial DMRS channel 1204(B), and an interpolated data channel 1206. In some examples, interpolating module 408 may divide augmented DMRS channel sequence 512 into estimated DMRS channel 1202, artificial DMRS channel 1204(A), and/or artificial DMRS channel 1204(B).

Additionally, in some examples, interpolating module 408 may include, between DMRS channels included in the estimated DMRS channel sequence, a first amount of zero-valued samples, and may include, between DMRS channels included in the first artificial DMRS channel sequence and the second artificial DMRS channel sequence, a second amount of zero-valued samples. In some examples, the second amount of zero-valued samples may be greater than the first amount.

As shown in FIG. 12, interpolating module 408 has inserted zero-values between some of the estimated and/or artificial DMRS channels. A number of zeros inserted between some channels may not be equal to another number of zeros inserted between other channels. In other words, a first number of zeros inserted between a first channel and a second channel may not be equal to a second number of zeros inserted between a third channel and a fourth channel.

Figure 13:
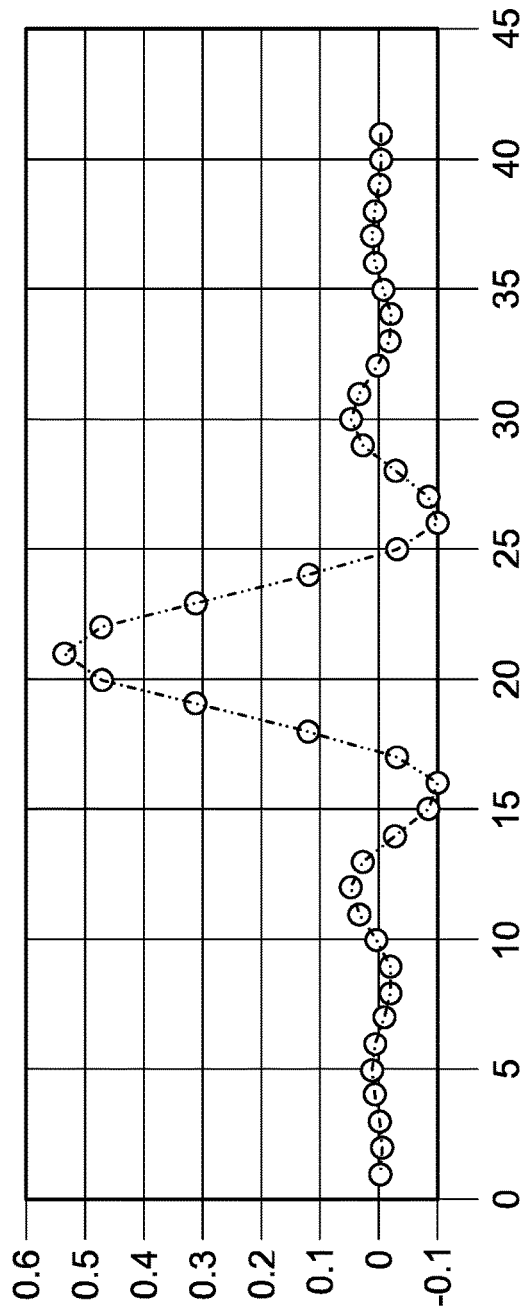
FIG. 13 shows an example of a low-pass filter that embodiments of the systems and methods disclosed herein use to interpolate a data channel.

FIG. 13 shows low-pass filter diagram 1300 of a low-pass filter that interpolating module 408 may use to interpolate interpolated data channel 518 from FIG. 5 and/or interpolated data channel 1206 from FIG. 12. In general, a low-pass filter is a type of electronic filter that allows low-frequency signals to pass through it while attenuating high-frequency signals.

Figure 14:
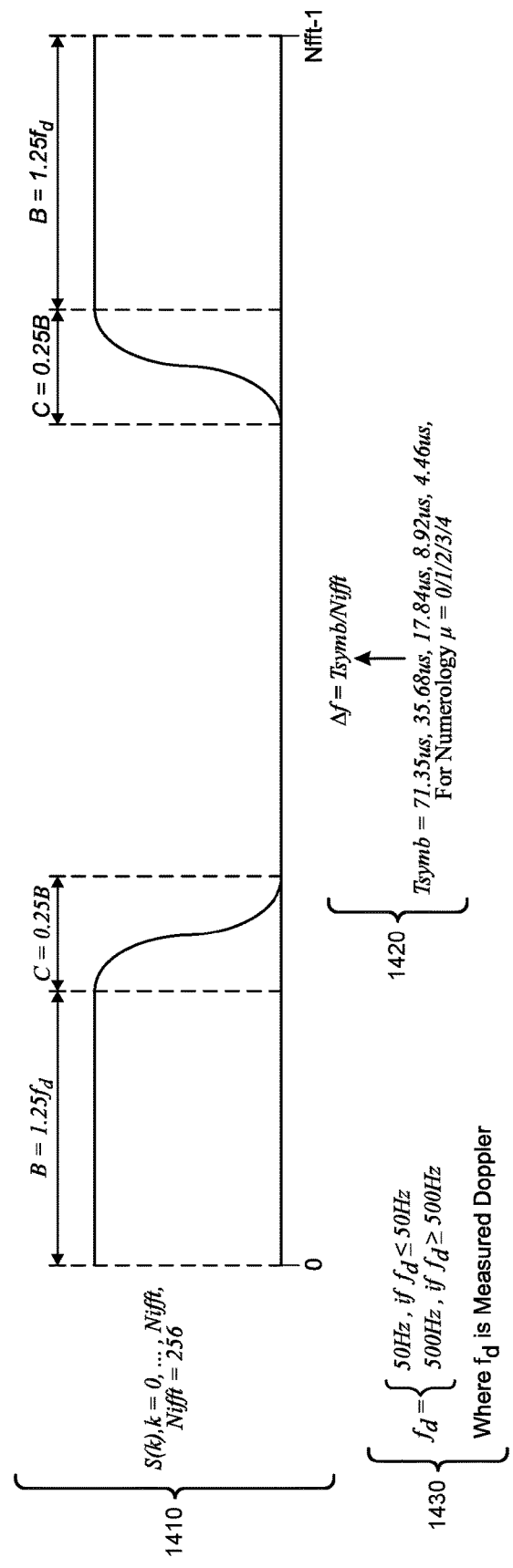
FIG. 14 shows a diagram that illustrates a method of determining a bandwidth for a low-pass filter.

In some examples, a bandwidth of the low-pass filter may be controlled by and/or determined based on a Doppler shift. For example, FIG. 14 shows a diagram 1400 that illustrates a method of determining a bandwidth for the low-pass filter. As shown in diagram 1410, the bandwidth of the low-pass filter may be B=1.25$f_d$, with a roll-off of 0.25B, where $f_d$ is the measured Doppler. In some examples, the roll-off shape may be similar to and/or defined in accordance with a raised-cosine filter. Diagram 1410 further illustrates an example where S(k), k=0 . . . , Nifft, Nifft=256, and Δf=Tsymb/Nifft. In this example, as shown in diagram 1420, Tsymb=71.35 μs, 35.68 μs, 17.84 μs, 8.92 μs, 4.46 μs for numerology μ=0/1/2/3/4. Additionally, in this example, as shown in diagram 1430, $$f_d = \begin{cases} 50 \text{ Hz, if } f_d \leq 50 \text{ Hz} \\ f_d \\ 500 \text{ Hz, if } f_d \geq 500 \text{ Hz} \end{cases} \quad (1)$$

Figure 15:
FIG. 15 illustrates additional systems and methods for interpolation filter design that may be included as part of the systems and methods described herein.

FIG. 15 further discloses and/or illustrates additional systems and methods for interpolation filter design that may be included as part of the systems and methods described herein. FIG. 15 includes a diagram 1500 that illustrates an example of how a low-pass filter may be windowed in the time domain. As shown, converting from the frequency domain to the time domain may be accomplished in accordance with $$s(n) = iFFT(H), n = -\frac{Nifft}{2} + 1, -\frac{Nifft}{2} + 2, \ldots, -1, 0, 1, \ldots, \frac{Nifft}{2} \quad (2)$$

and windowing performed in accordance with $$h(n) = s(n)w(n) \quad (3)$$

As shown and/or described in diagram 1500, window w(n) width covers up to an extended and extrapolated edge (e.g., extrapolated DMRS channel sequence 516). Window w(n) may be a Hamming window or other suitable window with comparatively small ripples in the pass band.

The systems and methods disclosed herein may generally introduce DMRS channel extension and DMRS channel extrapolation to create artificial DMRS channels that have the same statistics as the estimated DMRS channels. These artificial DMRS channels may be added to one or both sides of the estimated DMRS channels. In some examples, the augmented sequence of DMRS channels may allow simple low-pass interpolation filters to interpolate the data channel estimation. In additional examples, the bandwidth of the low-pass interpolation filter may be determined based on a measured Doppler from the estimated DMRS channel.

Embodiments of the systems and methods disclosed herein may receive a frequency-domain channel estimation signal as part of a DMRS channel estimation operation. Based on the sequence of DMRS channels, embodiments may generate an augmented DMRS channel sequence. Generating the augmented DMRS channel sequence may include generating an extended DMRS channel sequence that includes a plurality of extended DMRS channels that extend a frequency range of the sequence of DMRS channels. Generating the augmented DMRS channel sequence may also include generating an extrapolated DMRS channel sequence that includes a plurality of extrapolated DMRS channels that further extend the frequency range of the sequence of DMRS channels. Embodiments may further interpolate, via a low-pass filter sampled at a sample interval, a data channel based on the augmented DMRS channel sequence.

The many benefits of the disclosed systems and methods over conventional techniques for data channel estimation include enabling a simple low-pass filter to interpolate a data channel, which may significantly improve data channel estimation, particularly for DMRS-AdditionalPosition=2 and DMRS-AdditionalPosition=3, and for higher order modulation such as 16 QAM, 64 QAM, and 256 QAM.

The following example embodiments are also included in this disclosure:

The following example embodiments are also included in this disclosure:

Example 1: A computer-implemented method comprising (1) receiving, as part of a DMRS channel estimation operation, a frequency-domain channel estimation signal comprising a sequence of DMRS channels, (2) generating, based on the sequence of DMRS channels, an augmented DMRS channel sequence by generating (A) based on an edge DMRS channel and an additional DMRS channel included in the sequence of DMRS channels, an extended DMRS channel sequence comprising a plurality of extended DMRS channels that extend a frequency range of the sequence of DMRS channels, (B) based on at least one interpolation matrix and the extended DMRS channel sequence, an extrapolated DMRS channel sequence comprising a plurality of extrapolated DMRS channels that further extend the frequency range of the sequence of DMRS channels, and (3) interpolating, via a low-pass filter sampled at a sample interval, a data channel based on the augmented DMRS channel sequence.

Example 2: The computer-implemented method of example 1, wherein generating the extended DMRS channel sequence comprises executing a first extension of the sequence of DMRS channels, the first extension comprising a right extension of the sequence of DMRS channels, the right extension comprising (1) including the sequence of DMRS channels in the extended DMRS channel sequence, (2) designating, as a head DMRS channel, a DMRS channel included in the sequence of DMRS channels having a highest frequency among DMRS channels included in the sequence of DMRS channels, (3) including, in a tail sequence of the sequence of DMRS channels, all DMRS channels included in the sequence of DMRS channels having a frequency lower than the highest frequency among DMRS channels included in the sequence of DMRS channels, (4) for each DMRS channel in the tail sequence of the sequence of DMRS channels, (A) determining an extended DMRS channel based on a magnitude of the head DMRS channel and a complex conjugate of the additional DMRS channel, and (B) including the extended DMRS channel in the extended DMRS channel sequence.

Example 3: The computer-implemented method of example 2, wherein the first extension further comprises a left extension of the sequence of DMRS channels, the left extension comprising (1) designating, as the head DMRS channel, a DMRS channel included in the sequence of DMRS channels having a lowest frequency among the DMRS channels included in the sequence of DMRS channels, (2) including, in the tail sequence of the sequence of DMRS channels, all DMRS channels included in the sequence of DMRS channels having a frequency higher than the lowest frequency among DMRS channels included in the sequence of DMRS channels, (3) for each DMRS channel in the tail sequence of the sequence of DMRS channels, (A) determining an extended DMRS channel based on a magnitude of the head DMRS channel and a complex conjugate of the DMRS channel, and (B) including the extended DMRS channel in the extended DMRS channel sequence.

Example 4: The computer-implemented method of example 3, wherein (1) a DMRS Additional Position value associated with the frequency-domain channel estimation signal comprises a value of three, (2) the sequence of DMRS channels comprises four DMRS channels, (3) after the right extension, the extended DMRS channel sequence comprises four DMRS channels, and (4) after the left extension, the extended DMRS channel sequence comprises ten DMRS channels.

Example 5: The computer-implemented method of any of examples 3-4, wherein (1) a DMRS Additional Position value associated with the frequency-domain channel estimation signal comprises a value of two, (2) the sequence of DMRS channels comprises three DMRS channels, (3) after the right extension, the extended DMRS channel sequence comprises five DMRS channels, and (4) after the left extension, the extended DMRS channel sequence comprises seven DMRS channels.

Example 6: The computer-implemented method of any of examples 3-5, wherein (1) a DMRS Additional Position value associated with the frequency-domain channel estimation signal comprises a value of one, (2) the sequence of DMRS channels comprises two DMRS channels, (3) generating the extended DMRS channel sequence further comprises executing a second extension of the sequence of DMRS channels, the second extension comprising (A) designating DMRS channels included in the extended DMRS channel sequence after the first extension as an intermediate DMRS channel sequence, (B) designating, as the head DMRS channel, a DMRS channel included in the intermediate DMRS channel sequence and having a highest frequency among DMRS channels included in the intermediate DMRS channel sequence, (C) including, in a tail sequence of the intermediate DMRS channel sequence, all DMRS channels included in the intermediate DMRS channel sequence having a frequency lower than the highest frequency among DMRS channels included in the intermediate DMRS channel sequence, (D) for each DMRS channel in the tail sequence of the intermediate DMRS channel sequence, (i) determining an extended DMRS channel based on a magnitude of the head DMRS channel and a complex conjugate of the additional DMRS channel, and (ii) including the extended DMRS channel in the extended DMRS channel sequence.

Example 7: The computer-implemented method of example 6, wherein the second extension further comprises (1) designating a DMRS channel included in the intermediate DMRS channel sequence having a lowest frequency among DMRS channels included in the intermediate DMRS channel sequence as the head DMRS channel, (2) including, in the tail sequence of the intermediate DMRS channel sequence, all DMRS channels included in the intermediate DMRS channel sequence having a frequency higher than the lowest frequency among DMRS channels included in the intermediate DMRS channel sequence, (3) for each additional DMRS channel in the tail sequence of the intermediate DMRS channel sequence, (A) determining an additional extended DMRS channel based on a magnitude of the head DMRS channel and a complex conjugate of the additional DMRS channel, and (B) including the additional extended DMRS channel in the extended DMRS channel sequence.

Example 8: The computer-implemented method of any of examples 1-7, wherein generating the extrapolated DMRS channel sequence further comprises applying (1) a left interpolation matrix to a left edge of the extended DMRS channel sequence to generate a left extrapolated edge, and (2) a right interpolation matrix to a right edge of the extended DMRS channel sequence to generate a right extrapolated edge.

Example 9: The computer-implemented method of any of examples 1-8, further comprising, prior to interpolating the data channel based on the augmented DMRS channel sequence (1) dividing the augmented DMRS channel sequence into a first artificial DMRS channel sequence, an estimated DMRS channel sequence, and a second artificial DMRS channel sequence, (2) including, between DMRS channels included in the estimated DMRS channel sequence, a first amount of zero-valued samples, and (3) including, between DMRS channels included in the first artificial DMRS channel sequence and the second artificial DMRS channel sequence, a second amount of zero-valued samples, wherein the second amount of zero-valued samples is greater than the first amount.

Example 10: The computer-implemented method of any of examples 1-9, further comprising determining a bandwidth of the low-pass filter based on a Doppler shift of DMRS channels included in the augmented DMRS channel sequence.

Example 11: The computer-implemented method of any of examples 1-9, further comprising windowing the low-pass filter in a time domain in accordance with a windowing function prior to interpolating the data channel based on the augmented DMRS channel sequence.

Example 12: A system comprising (1) a receiving module, stored in memory, that receives, as part of a DMRS channel estimation operation, a frequency-domain channel estimation signal comprising a sequence of DMRS channels, (2) a generating module, stored in memory, that generates, based on the sequence of DMRS channels, an augmented DMRS channel sequence by generating (A) based on an edge DMRS channel and an additional DMRS channel included in the sequence of DMRS channels, an extended DMRS channel sequence comprising a plurality of extended DMRS channels that extend a frequency range of the sequence of DMRS channels, (B) based on at least one interpolation matrix and the extended DMRS channel sequence, an extrapolated DMRS channel sequence comprising a plurality of extrapolated DMRS channels that further extend the frequency range of the sequence of DMRS channels, (3) an interpolating module, stored in memory, that interpolates, via a low-pass filter sampled at a sample interval, a data channel based on the augmented DMRS channel sequence, and (4) at least one physical processor that executes the receiving module, the generating module, and the interpolating module.

Example 13: The system of example 12, wherein the generating module generates the extended DMRS channel sequence by executing a first extension of the sequence of DMRS channels, the first extension comprising a right extension of the sequence of DMRS channels, the right extension comprising (1) including the sequence of DMRS channels in the extended DMRS channel sequence, (2) designating, as a head DMRS channel, a DMRS channel included in the sequence of DMRS channels having a highest frequency among DMRS channels included in the sequence of DMRS channels, (3) including, in a tail sequence of the sequence of DMRS channels, all DMRS channels included in the sequence of DMRS channels having a frequency lower than the highest frequency among DMRS channels included in the sequence of DMRS channels, (4) for each DMRS channel in the tail sequence of the sequence of DMRS channels, (A) determining an extended DMRS channel based on a magnitude of the head DMRS channel and a complex conjugate of the additional DMRS channel, and (B) including the extended DMRS channel in the extended DMRS channel sequence.

Example 14: The system of example 13, wherein the first extension further comprises a left extension of the sequence of DMRS channels, the left extension comprising (1) designating, as the head DMRS channel, a DMRS channel included in the sequence of DMRS channels having a lowest frequency among the DMRS channels included in the sequence of DMRS channels, (2) including, in the tail sequence of the sequence of DMRS channels, all DMRS channels included in the sequence of DMRS channels having a frequency higher than the lowest frequency among DMRS channels included in the sequence of DMRS channels, (3) for each DMRS channel in the tail sequence of the sequence of DMRS channels, (A) determining an extended DMRS channel based on a magnitude of the head DMRS channel and a complex conjugate of the DMRS channel, and (B) including the extended DMRS channel in the extended DMRS channel sequence.

Example 15: The system of example 14, wherein (1) a DMRS Additional Position value associated with the frequency-domain channel estimation signal comprises a value of one, (2) the sequence of DMRS channels comprises two DMRS channels, (3) the generating module generates the extended DMRS channel sequence by further executing a second extension of the sequence of DMRS channels, the second extension comprising (A) designating DMRS channels included in the extended DMRS channel sequence after the first extension as an intermediate DMRS channel sequence, (B) designating, as the head DMRS channel, a DMRS channel included in the intermediate DMRS channel sequence and having a highest frequency among DMRS channels included in the intermediate DMRS channel sequence, (C) including, in a tail sequence of the intermediate DMRS channel sequence, all DMRS channels included in the intermediate DMRS channel sequence having a frequency lower than the highest frequency among DMRS channels included in the intermediate DMRS channel sequence, (D) for each DMRS channel in the tail sequence of the intermediate DMRS channel sequence, (i) determining an extended DMRS channel based on a magnitude of the head DMRS channel and a complex conjugate of the additional DMRS channel, and (ii) including the extended DMRS channel in the extended DMRS channel sequence.

Example 16: The system of example 15, wherein the second extension further comprises (1) designating a DMRS channel included in the intermediate DMRS channel sequence having a lowest frequency among DMRS channels included in the intermediate DMRS channel sequence as the head DMRS channel, (2) including, in the tail sequence of the intermediate DMRS channel sequence, all DMRS channels included in the intermediate DMRS channel sequence having a frequency higher than the lowest frequency among DMRS channels included in the intermediate DMRS channel sequence, (3) for each additional DMRS channel in the tail sequence of the intermediate DMRS channel sequence, (A) determining an additional extended DMRS channel based on a magnitude of the head DMRS channel and a complex conjugate of the additional DMRS channel, and (B) including the additional extended DMRS channel in the extended DMRS channel sequence.

Example 17: The system of any of examples 12-16, wherein the generating module generates the extrapolated DMRS channel sequence by further applying (1) a left interpolation matrix to a left edge of the extended DMRS channel sequence to generate a left extrapolated edge, and (2) a right interpolation matrix to a right edge of the extended DMRS channel sequence to generate a right extrapolated edge.

Example 18: A system comprising (1) a fifth-generation new radio base station that receives an uplink signal from a user equipment device, the uplink signal comprising a frequency domain channel estimation signal comprising a plurality of demodulation reference signal DMRS samples, (2) a channel estimation device comprising (A) a receiving module that receives, as part of a DMRS channel estimation operation, a frequency-domain channel estimation signal comprising a sequence of DMRS channels, (B) a generating module that generates, based on the sequence of DMRS channels, an augmented DMRS channel sequence by generating (1) based on an edge DMRS channel and an additional DMRS channel included in the sequence of DMRS channels, an extended DMRS channel sequence comprising a plurality of extended DMRS channels that extend a frequency range of the sequence of DMRS channels, (2) based on at least one interpolation matrix and the extended DMRS channel sequence, an extrapolated DMRS channel sequence comprising a plurality of extrapolated DMRS channels that further extend the frequency range of the sequence of DMRS channels, and (C) an interpolating module that interpolates, via a low-pass filter sampled at a sample interval, a data channel based on the augmented DMRS channel sequence.

Example 19: The system of example 18, wherein the generating module generates the extended DMRS channel sequence by executing a first extension of the sequence of DMRS channels, the first extension comprising a right extension of the sequence of DMRS channels, the right extension comprising (1) including the sequence of DMRS channels in the extended DMRS channel sequence, (2) designating, as a head DMRS channel, a DMRS channel included in the sequence of DMRS channels having a highest frequency among DMRS channels included in the sequence of DMRS channels, (3) including, in a tail sequence of the sequence of DMRS channels, all DMRS channels included in the sequence of DMRS channels having a frequency lower than the highest frequency among DMRS channels included in the sequence of DMRS channels, (4) for each DMRS channel in the tail sequence of the sequence of DMRS channels, (A) determining an extended DMRS channel based on a magnitude of the head DMRS channel and a complex conjugate of the additional DMRS channel, and (B) including the extended DMRS channel in the extended DMRS channel sequence.

Example 20: The system of example 19, wherein the first extension further comprises a left extension of the sequence of DMRS channels, the left extension comprising (1) designating, as the head DMRS channel, a DMRS channel included in the sequence of DMRS channels having a lowest frequency among the DMRS channels included in the sequence of DMRS channels, (2) including, in the tail sequence of the sequence of DMRS channels, all DMRS channels included in the sequence of DMRS channels having a frequency higher than the lowest frequency among DMRS channels included in the sequence of DMRS channels, (3) for each DMRS channel in the tail sequence of the sequence of DMRS channels, (A) determining an extended DMRS channel based on a magnitude of the head DMRS channel and a complex conjugate of the DMRS channel, and (B) including the extended DMRS channel in the extended DMRS channel sequence.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a frequency domain signal to be transformed, transform the frequency domain signal, output a result of the transformation to perform a channel estimation function, use the result of the transformation to estimate an uplink data channel, and store the result of the transformation to maintain or reestablish a connection with a UE device via the uplink channel. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, as part of a data channel estimation operation, a frequency-domain channel estimation signal comprising a sequence of demodulation reference signal (DMRS) channels;
   generating, based on the sequence of DMRS channels, an augmented DMRS channel sequence by generating:
      based on an edge DMRS channel and an additional DMRS channel included in the sequence of DMRS channels, an extended DMRS channel sequence comprising a plurality of extended DMRS channels that extend a frequency range of the sequence of DMRS channels;
      based on at least one interpolation matrix and the extended DMRS channel sequence, an extrapolated DMRS channel sequence comprising a plurality of extrapolated DMRS channels that further extend the frequency range of the sequence of DMRS channels; and
   interpolating, via a low-pass filter sampled at a sample interval, a data channel based on the augmented DMRS channel sequence.

2. The computer-implemented method of claim 1, wherein generating the extended DMRS channel sequence comprises executing a first extension of the sequence of DMRS channels, the first extension comprising a right extension of the sequence of DMRS channels, the right extension comprising:
   including the sequence of DMRS channels in the extended DMRS channel sequence;
   designating, as a head DMRS channel, a DMRS channel included in the sequence of DMRS channels having a highest frequency among DMRS channels included in the sequence of DMRS channels;
   including, in a tail sequence of the sequence of DMRS channels, all DMRS channels included in the sequence of DMRS channels having a frequency lower than the highest frequency among DMRS channels included in the sequence of DMRS channels;
   for each DMRS channel in the tail sequence of the sequence of DMRS channels:
      determining an extended DMRS channel based on a magnitude of the head DMRS channel and a complex conjugate of the additional DMRS channel; and
      including the extended DMRS channel in the extended DMRS channel sequence.

3. The computer-implemented method of claim 2, wherein the first extension further comprises a left extension of the sequence of DMRS channels, the left extension comprising:
   designating, as the head DMRS channel, a DMRS channel included in the sequence of DMRS channels having a lowest frequency among the DMRS channels included in the sequence of DMRS channels;
   including, in the tail sequence of the sequence of DMRS channels, all DMRS channels included in the sequence of DMRS channels having a frequency higher than the lowest frequency among DMRS channels included in the sequence of DMRS channels;
   for each DMRS channel in the tail sequence of the sequence of DMRS channels:
      determining an extended DMRS channel based on a magnitude of the head DMRS channel and a complex conjugate of the DMRS channel; and
      including the extended DMRS channel in the extended DMRS channel sequence.

4. The computer-implemented method of claim 3, wherein:
   a DMRS Additional Position value associated with the frequency-domain channel estimation signal comprises a value of three;
   the sequence of DMRS channels comprises four DMRS channels;
   after the right extension, the extended DMRS channel sequence comprises four DMRS channels; and
   after the left extension, the extended DMRS channel sequence comprises ten DMRS channels.

5. The computer-implemented method of claim 3, wherein:
   a DMRS Additional Position value associated with the frequency-domain channel estimation signal comprises a value of two;
   the sequence of DMRS channels comprises three DMRS channels;
   after the right extension, the extended DMRS channel sequence comprises five DMRS channels; and
   after the left extension, the extended DMRS channel sequence comprises seven DMRS channels.

6. The computer-implemented method of claim 3, wherein:
   a DMRS Additional Position value associated with the frequency-domain channel estimation signal comprises a value of one;
   the sequence of DMRS channels comprises two DMRS channels;
   generating the extended DMRS channel sequence further comprises executing a second extension of the sequence of DMRS channels, the second extension comprising:
      designating DMRS channels included in the extended DMRS channel sequence after the first extension as an intermediate DMRS channel sequence;
      designating, as the head DMRS channel, a DMRS channel included in the intermediate DMRS channel sequence and having a highest frequency among DMRS channels included in the intermediate DMRS channel sequence;
      including, in a tail sequence of the intermediate DMRS channel sequence, all DMRS channels included in the intermediate DMRS channel sequence having a frequency lower than the highest frequency among DMRS channels included in the intermediate DMRS channel sequence;
      for each DMRS channel in the tail sequence of the intermediate DMRS channel sequence:
         determining an extended DMRS channel based on a magnitude of the head DMRS channel and a complex conjugate of the additional DMRS channel; and
         including the extended DMRS channel in the extended DMRS channel sequence.

7. The computer-implemented method of claim 6, wherein the second extension further comprises:
   designating a DMRS channel included in the intermediate DMRS channel sequence having a lowest frequency among DMRS channels included in the intermediate DMRS channel sequence as the head DMRS channel;
   including, in the tail sequence of the intermediate DMRS channel sequence, all DMRS channels included in the intermediate DMRS channel sequence having a frequency higher than the lowest frequency among DMRS channels included in the intermediate DMRS channel sequence;
   for each additional DMRS channel in the tail sequence of the intermediate DMRS channel sequence:

determining an additional extended DMRS channel based on a magnitude of the head DMRS channel and a complex conjugate of the additional DMRS channel; and including the additional extended DMRS channel in the extended DMRS channel sequence.

8. The computer-implemented method of claim 1, wherein generating the extrapolated DMRS channel sequence further comprises applying:

a left interpolation matrix to a left edge of the extended DMRS channel sequence to generate a left extrapolated edge; and a right interpolation matrix to a right edge of the extended DMRS channel sequence to generate a right extrapolated edge.

9. The computer-implemented method of claim 1, further comprising, prior to interpolating the data channel based on the augmented DMRS channel sequence:

dividing the augmented DMRS channel sequence into a first artificial DMRS channel sequence, an estimated DMRS channel sequence, and a second artificial DMRS channel sequence;

including, between DMRS channels included in the estimated DMRS channel sequence, a first amount of zero-valued samples; and including, between DMRS channels included in the first artificial DMRS channel sequence and the second artificial DMRS channel sequence, a second amount of zero-valued samples, wherein the second amount of zero-valued samples is greater than the first amount.

10. The computer-implemented method of claim 1, further comprising determining a bandwidth of the low-pass filter based on a Doppler shift of DMRS channels included in the augmented DMRS channel sequence.

11. The computer-implemented method of claim 1, further comprising windowing the low-pass filter in a time domain in accordance with a windowing function prior to interpolating the data channel based on the augmented DMRS channel sequence.

12. A system comprising:

a receiving module, stored in memory, that receives, as part of a data channel estimation operation, a frequency-domain channel estimation signal comprising a sequence of demodulation reference signal (DMRS) channels;

a generating module, stored in memory, that generates, based on the sequence of DMRS channels, an augmented DMRS channel sequence by generating:

based on an edge DMRS channel and an additional DMRS channel included in the sequence of DMRS channels, an extended DMRS channel sequence comprising a plurality of extended DMRS channels that extend a frequency range of the sequence of DMRS channels;

based on at least one interpolation matrix and the extended DMRS channel sequence, an extrapolated DMRS channel sequence comprising a plurality of extrapolated DMRS channels that further extend the frequency range of the sequence of DMRS channels;

an interpolating module, stored in memory, that interpolates, via a low-pass filter sampled at a sample interval, a data channel based on the augmented DMRS channel sequence; and at least one physical processor that executes the receiving module, the generating module, and the interpolating module.

13. The system of claim 12, wherein the generating module generates the extended DMRS channel sequence by executing a first extension of the sequence of DMRS channels, the first extension comprising a right extension of the sequence of DMRS channels, the right extension comprising:

including the sequence of DMRS channels in the extended DMRS channel sequence;

designating, as a head DMRS channel, a DMRS channel included in the sequence of DMRS channels having a highest frequency among DMRS channels included in the sequence of DMRS channels;

including, in a tail sequence of the sequence of DMRS channels, all DMRS channels included in the sequence of DMRS channels having a frequency lower than the highest frequency among DMRS channels included in the sequence of DMRS channels;

for each DMRS channel in the tail sequence of the sequence of DMRS channels:

determining an extended DMRS channel based on a magnitude of the head DMRS channel and a complex conjugate of the additional DMRS channel; and including the extended DMRS channel in the extended DMRS channel sequence.

14. The system of claim 13, wherein the first extension further comprises a left extension of the sequence of DMRS channels, the left extension comprising:

designating, as the head DMRS channel, a DMRS channel included in the sequence of DMRS channels having a lowest frequency among the DMRS channels included in the sequence of DMRS channels;

including, in the tail sequence of the sequence of DMRS channels, all DMRS channels included in the sequence of DMRS channels having a frequency higher than the lowest frequency among DMRS channels included in the sequence of DMRS channels;

for each DMRS channel in the tail sequence of the sequence of DMRS channels:

determining an extended DMRS channel based on a magnitude of the head DMRS channel and a complex conjugate of the DMRS channel; and including the extended DMRS channel in the extended DMRS channel sequence.

15. The system of claim 14, wherein:

a DMRS Additional Position value associated with the frequency-domain channel estimation signal comprises a value of one;

the sequence of DMRS channels comprises two DMRS channels;

the generating module generates the extended DMRS channel sequence by further executing a second extension of the sequence of DMRS channels, the second extension comprising:

designating DMRS channels included in the extended DMRS channel sequence after the first extension as an intermediate DMRS channel sequence;

designating, as the head DMRS channel, a DMRS channel included in the intermediate DMRS channel sequence and having a highest frequency among DMRS channels included in the intermediate DMRS channel sequence;

including, in a tail sequence of the intermediate DMRS channel sequence, all DMRS channels included in the intermediate DMRS channel sequence having a frequency lower than the highest frequency among DMRS channels included in the intermediate DMRS channel sequence;

for each DMRS channel in the tail sequence of the intermediate DMRS channel sequence:
determining an extended DMRS channel based on a magnitude of the head DMRS channel and a complex conjugate of the additional DMRS channel; and
including the extended DMRS channel in the extended DMRS channel sequence.

16. The system of claim 15, wherein the second extension further comprises:
designating a DMRS channel included in the intermediate DMRS channel sequence having a lowest frequency among DMRS channels included in the intermediate DMRS channel sequence as the head DMRS channel;
including, in the tail sequence of the intermediate DMRS channel sequence, all DMRS channels included in the intermediate DMRS channel sequence having a frequency higher than the lowest frequency among DMRS channels included in the intermediate DMRS channel sequence;
for each additional DMRS channel in the tail sequence of the intermediate DMRS channel sequence:
determining an additional extended DMRS channel based on a magnitude of the head DMRS channel and a complex conjugate of the additional DMRS channel; and
including the additional extended DMRS channel in the extended DMRS channel sequence.

17. The system of claim 12, wherein the generating module generates the extrapolated DMRS channel sequence by further applying:
a left interpolation matrix to a left edge of the extended DMRS channel sequence to generate a left extrapolated edge; and
a right interpolation matrix to a right edge of the extended DMRS channel sequence to generate a right extrapolated edge.

18. A system comprising:
a fifth-generation new radio base station that receives an uplink signal from a user equipment device, the uplink signal comprising a frequency domain channel estimation signal comprising a plurality of demodulation reference signal (DMRS) channels;
a channel estimation device comprising:
a receiving module that receives, as part of a data channel estimation operation, a frequency-domain channel estimation signal comprising a sequence of DMRS channels;
a generating module that generates, based on the sequence of DMRS channels, an augmented DMRS channel sequence by generating:
based on an edge DMRS channel and an additional DMRS channel included in the sequence of DMRS channels, an extended DMRS channel sequence comprising a plurality of extended DMRS channels that extend a frequency range of the sequence of DMRS channels;
based on at least one interpolation matrix and the extended DMRS channel sequence, an extrapolated DMRS channel sequence comprising a plurality of extrapolated DMRS channels that further extend the frequency range of the sequence of DMRS channels; and
an interpolating module that interpolates, via a low-pass filter sampled at a sample interval, a data channel based on the augmented DMRS channel sequence.

19. The system of claim 18, wherein the generating module generates the extended DMRS channel sequence by executing a first extension of the sequence of DMRS channels, the first extension comprising a right extension of the sequence of DMRS channels, the right extension comprising:
including the sequence of DMRS channels in the extended DMRS channel sequence;
designating, as a head DMRS channel, a DMRS channel included in the sequence of DMRS channels having a highest frequency among DMRS channels included in the sequence of DMRS channels;
including, in a tail sequence of the sequence of DMRS channels, all DMRS channels included in the sequence of DMRS channels having a frequency lower than the highest frequency among DMRS channels included in the sequence of DMRS channels;
for each DMRS channel in the tail sequence of the sequence of DMRS channels:
determining an extended DMRS channel based on a magnitude of the head DMRS channel and a complex conjugate of the additional DMRS channel; and
including the extended DMRS channel in the extended DMRS channel sequence.

20. The system of claim 19, wherein the first extension further comprises a left extension of the sequence of DMRS channels, the left extension comprising:
designating, as the head DMRS channel, a DMRS channel included in the sequence of DMRS channels having a lowest frequency among the DMRS channels included in the sequence of DMRS channels;
including, in the tail sequence of the sequence of DMRS channels, all DMRS channels included in the sequence of DMRS channels having a frequency higher than the lowest frequency among DMRS channels included in the sequence of DMRS channels;
for each DMRS channel in the tail sequence of the sequence of DMRS channels:
determining an extended DMRS channel based on a magnitude of the head DMRS channel and a complex conjugate of the DMRS channel; and
including the extended DMRS channel in the extended DMRS channel sequence.

\* \* \* \* \*